United States Patent [19]
Lewis

[11] Patent Number: 6,021,269
[45] Date of Patent: Feb. 1, 2000

[54] RADIATION SOURCE DETECTION BY RECORDING SPECTRAL RECORDS AT DIFFERENT TIMES OR LOCATIONS AND COLLATING THE SPECTRAL RECORDS

[76] Inventor: Owen Melfyn Lewis, P.O. Box 442, Andover Hampshire SP10 1SP, United Kingdom

[21] Appl. No.: 08/817,136

[22] PCT Filed: Oct. 16, 1995

[86] PCT No.: PCT/GB95/02440

§ 371 Date: Apr. 9, 1997

§ 102(e) Date: Apr. 9, 1997

[87] PCT Pub. No.: WO96/12199

PCT Pub. Date: Apr. 25, 1996

[30] Foreign Application Priority Data

Oct. 14, 1994 [GB] United Kingdom .................... 9420742

[51] Int. Cl.[7] .................................................. G06F 17/00
[52] U.S. Cl. ................................ 395/500.26; 324/76.19; 455/161.1; 455/226.1
[58] Field of Search ......................... 395/500.26, 500.23, 395/500.27; 707/104; 345/355, 356, 4, 6; 704/237; 455/150.1, 154.1, 154.2, 157.2, 160.1, 161.1, 158.1, 161.3, 184.1, 226.1, 227, 228, 229; 324/76.12, 76.19, 76.33

[56] References Cited

U.S. PATENT DOCUMENTS

| | | | |
|---|---|---|---|
| 4,805,231 | 2/1989 | Whidden | 455/228 |
| 4,924,450 | 5/1990 | Brashear et al. | |
| 5,241,699 | 8/1993 | Barsumian | 455/228 |
| 5,261,007 | 11/1993 | Hirsch | 704/237 |
| 5,457,815 | 10/1995 | Morewitz et al. | 455/161.1 |
| 5,600,138 | 2/1997 | Colson et al. | 250/330 |

OTHER PUBLICATIONS

Health Physics, vol. 60, No. 3, Mar. 1991, Elmsford, N.Y., U.S. pp. 367–373, XP 000224221; Berven et al "A Method to Automate Radiological Surveys".

*Primary Examiner*—Viet D. Vu
*Attorney, Agent, or Firm*—Frishauf, Holtz, Goodman, Langer & Chick, P.C.

[57] ABSTRACT

In an apparatus and method for detecting radiation transmitters (such as "bugs" or leaky data cables), spectral records are recorded at different times and/or locations. The records are displayed graphically and compared to identify transmitters. Spurious signals, for example as caused by taxi radio transmissions, can be eliminated since these will not appear in all records. A local transmitter of the type to be detected will appear in all records for a given location, but not in records for other locations. The strength of the transmitter signal varies as the reciprocal of the distance squared, and the presence of the transmitter and its position can be located by moving the recorder and detecting the rise or fall of the displayed graphical signal.

41 Claims, 21 Drawing Sheets

SPECTRA

TEST 11  06/08/94  18:31

TEST 11  06/08/94  18:31

TEST 11  06/08/94  18:34

TEST 11  06/08/94  18:37

TEST 41  06/08/94  18:55

TEST 41  06/08/94  18:59

TEST 41  06/08/94  19:02

TEST 61  06/08/94  18:21

TEST 61  06/08/94  18:25

TEST 61  06/08/94  18:28

*FIG. 13*

TEST 41 06/08/94 19:02

15.406MHz 224

16.668MHz 224

18.338MHz 224

19.869MHz 227

21.369MHz 225

*FIG. 14*

RADIATION SOURCE DETECTION BY RECORDING SPECTRAL RECORDS AT DIFFERENT TIMES OR LOCATIONS AND COLLATING THE SPECTRAL RECORDS

The present invention relates to the field of data processing, and has particular application in the collation and analysis of spectral data records (for example for surveillance counter measure work, such as the detection of bugs or for other applications, such as the detection of "leaky" data cables).

The usual way to detect bugs is via their transmissions. Two types of wide band scanning receivers are commonly used:

high quality communication receivers, often originally designed for the amateur or defence markets, which excel at the detection of weak signals and are designed to give clear reception with superb selectivity;

harmonic receivers purpose built for bug detection. These purpose built scanners have little selectivity, in the particular sense that they will detect signals from any transmitter within their designated band of coverage, either instantaneously or within a very short scanning cycle.

ICOM 7000 and 9000 series and Watkins Johnson Miniceptor receivers are examples of the first category of receiver, and the Datong Ranger 2+ and Audiotel ECM are examples of the latter.

Use of an ICOM-type receiver relies heavily on the skill, patience and concentration of a skilled operator to listen to each voice channel in the entire spectrum covered, typically 0–2000 MHz. To do this with maximum efficiency, the receiver must be set to move through much of the band in increments of not greater than 10 KHz (5 KHz would be optimal).

In a single scan, an operator has to listen momentarily to the audio content of each discrete channel, say 10,000 to 200,000 channels, the exact number being dependent on the scan pattern selected. Were such a scan to take three hours, the operator could not spend an average of more than a second on each channel. In that time the operator is required to become aware of a signal on any channel, and make a decision as to whether or not it is relevant to his task. With the finest grain of scan, this time would be impractically shortened.

Accordingly operators are forced to use scan patterns that leave holes in the cover. Even were there no holes in the cover, the operator is faced with an impossible task, since he must determine whether or not an emission of which he cannot understand the content is a security threat. Accordingly, other than for the simplest and plainest clear voice signals, the operator cannot always do so. Consequently, his opinion at the end of each complete spectrum scan is little more than a "best guess".

Though not as uniformly sensitive across their range as quality communication receivers, the harmonic scanners work faster and with an improved level of assurance. Typically, a single spectrum scan will take no more than ten minutes. In that scan, because of the harmonic effect (explained hereinafter), a bugging transmission at 25 MHz will be seen by the receiver (Ranger 2+) three times. At 100 MHz it will be seen six times, and over one hundred times at 1000 MHz.

The harmonic receivers are normally operated in one of several modes for detecting an active bug:

The "sonic loop": the receiver generates an audio tone of known modulation and then applies three or so demodulation techniques to radio signals that it detects, looking to recover its known audio signal. This can work reliably, but only against transmitters using one of the forms of signal modulation covered.

"Alert to strongest": In this mode the receiver alerts to the strongest signal it receives, or may alert to any signal above a set threshold strength, whether the receiver can cohere it or not. (Some single channel receivers also have this facility.) This can be a useful means of detection but is has serious limitations. For it to be effective, the bug must be the strongest, or almost the strongest, signal received. Under operational conditions where the spectral environment is as "dirty" as central London, Tokyo or Paris, this technique produces an unacceptable number of false alarms. Constant false alarms demotivate the operator to follow up each one rigorously; this results in a very substantial chance anything other than a simple and relatively low frequency bug simple being passed over.

"Manual tune": This allows an operator to tune and listen as with any other receiver, except that the operator listens to the content of many harmonics at once. This mode is much inferior (except in speed) to a single channel receiver.

However, none of the receivers, regardless of category, in common use for technical surveillance countermeasure work can, unaided, detect and alert to more sophisticated bugs, such as burst transmitters, frequency hoppers or advanced masked transmitters. Similarly, they have very limited capability against transmitters using complex modulations (including pulse code modulation), scramblers or digital encryption. In particular, the false alarm rate in "alert to strongest" mode is sufficient to allow, in the real world, a high level of invulnerability for bugs using such techniques. In addition, the higher the frequency of a bug the closer a harmonic scanner must be for an alert to be registered, regardless of the bug's mode of operation. This greatly improves the chances of SHF bugs evading detection.

In short, there is a clear need to redress shortcomings inherent in current search techniques.

The present invention comprises a method or apparatus which compares signal levels in spectral traces recorded at different places, or at different times. The signal levels are displayed as visual analogues in two and/or three-dimensional displays, to facilitate recognition of features characteristic of the transmitters to be detected. This exploits in particular the property of "inverse square law" fall-off in signal strength with distance. The fall-off with distance from a local transmitter will be evident between spectra recorded for example in different rooms within a building, whereas background noise from distant transmitters will be relatively constant for all rooms (or for a group of rooms facing the distant transmitter).

Similarly, comparison of spectra recorded in a given location at different times allows the operator to disregard signals which appear on the record for one location not because they originate very near to that location, but because they are transient signals present by coincidence at the time at which the record for that location was made (and hence do not appear in all traces for the location).

At the heart of the present embodiment is a computer-based apparatus designed to allow a simple and fast analysis of data to identify and locate relative changes between records. To do this, the apparatus creates graphical analogues of the data in two and three dimensional images and also lists relevant information.

In the present apparatus, hundreds of records of electromagnetic activity right across the spectrum can be stored and rapidly compared by signal strength, frequency and by user determined combinations of signal location, date, time or day of the week. Using a combination of displays, the user rapidly absorbs a relevant appreciation of activity in the local electromagnetic environment right across the range of the receiver.

These features allow the user to make intelligent use of otherwise useless information to reliably detect the presence of any bugging transmitter, when active. In fact, complex transmissions often have particular characteristics that make it easier to identify them with the present apparatus than with some cheaper and simpler systems.

The potential range of applications for the apparatus is wide. However, in one form, it can be tailored for the detection of electronic eavesdropping in the form of active, covert transmitters. In this role, the apparatus can operate with either the Audiotel Scanlock ECM (new or modified) or the Datong Ranger 2+ harmonic scanning electronic countermeasures receivers.

The apparatus makes electronic surveillance countermeasures faster, more precise and more comprehensive than ever before; such that work, in the past considered too difficult or time consuming, can now be undertaken effectively and economically. With a "notebook" computer linked to a suitable countermeasures receiver, the following are carried out quickly and accurately:

Recording of all spectral activity levels at channel spacings of 2.5 KHz (Ranger) or 1 KHz (Scanlock). Spectral activity from 15 KHz to 2.0 GHz, a range of almost two million KHz, is measured and stored for analysis. Spectral records are communicated to and from the radio with MSDOS compatible files automatically being created and archived.

Permanent storage of spectral activity is simple and error-free as the apparatus uses its own unique filenaming routine that allows it to create almost half a million data records without risk of repeating itself.

Each file contains one complete spectral record, together with details of the site (for example one building), specific location (for example, one room), date and time at which the record was made. Fast and simple retrieval and comparative analysis of data, sorted by any of these (and other) parameters is made feasible.

Graphical comparison and analysis of spectral activity within a single site, in two and three dimensional displays and data listings, is facilitated. There are easy and effective zoom controls for concentrating attention on activity between specified limits. Cursors give an easy readout of specific data. There are rotatable 3-D net surface and silhouette displays.

Multiple window displays can be created and stored as menu options, to recall at the click of a mouse. All window displays are fully interrelated so that changing the analysis parameters or the changing of data in any window will automatically update the information displayed in all other windows that are open.

Simultaneous comparison of even hundreds of spectral activity records is possible, allowing instantaneous recognition of changes in activity levels against space or time or frequency. This capability is enhanced by the interrelated display of several different views of a set of information. Colour display is useful to help differentiate between different records, with monochrome display setting available as an alternative.

There are three graphical display windows available. In the present embodiment, all records of spectral data are loaded into the Main Display window which gives a x-y graph, plotting frequency against signal strength and superimposing the individual traces of each spectral record loaded into the display. Where several records are loaded simultaneously, a 3-D (x-y-z) graph of the composite information can be created. X and y scalings remain as frequency and signal strength, but the z axis parameter may be set to order and display records by their location, date, time, weekday or strength. This composite 3-D view of spectral activity enables a second 2-D plot to be created in addition to the main display.

The 2-D plot displays activity across a range of records, as measured at a particular frequency. This gives an x-z cut through the 3-D model and allows location, date, time, or weekday to be plotted against signal strength observed for a single frequency. The 2-D plot also allows recorded activity on a frequency to be displayed in strength order; in combination with other displays this may simplify some analyses.

A listing is provided of the site, location, date and time of activity information in records loaded into the main display window. The Names list can be sorted by any of these parameters which are displayed in the list. The Names list may also be sorted by signal strength as seen at the frequency cursor setting in the Main Display but this information cannot appropriately be listed in the Names list.

A listing of all peaks of activity above a user determined threshold for any one record of spectral activity can be displayed. Lists can be sorted by frequency or level of activity and the size of activity that will be recognised as an individual peak can also be user-set. Selection of a listed peak from the Peaks list will automatically update the graphical displays to display the peak selected.

Any graphic display or list can be printed. With a colour printer, the display colours will be reproduced. Using Windows 3.1™ cut and paste facility, any selected graphical display can be placed into text document for integrated presentation.

There are full controls to facilitate the unlimited copying, editing and the specific or bulk deletion of records, although these are not directly relevant to the present invention and will not be described in detail.

As an option, the apparatus may incorporate additional commands to control a fully automated and secure transfer of data to a central site for rapid and expert data analysis without the need for the analyst to attend at the site.

Embodiments of the invention will now be described, by way of example only, with reference to the accompanying drawings, in which:

FIG. 13 shows the contents of the Names window, listing all spectral records displayed;

FIG. 14 shows the contents of the Peaks window, listing the frequency and strength of peaks in the current spectrum (peaks above the set strength threshold being listed);

Before describing an example of the operation of the apparatus, the hardware and software structure will be briefly described, followed by a detailed description of the commands and displays provided by the apparatus for the analysis of recorded spectra.

HARDWARE STRUCTURE

Figure 1:
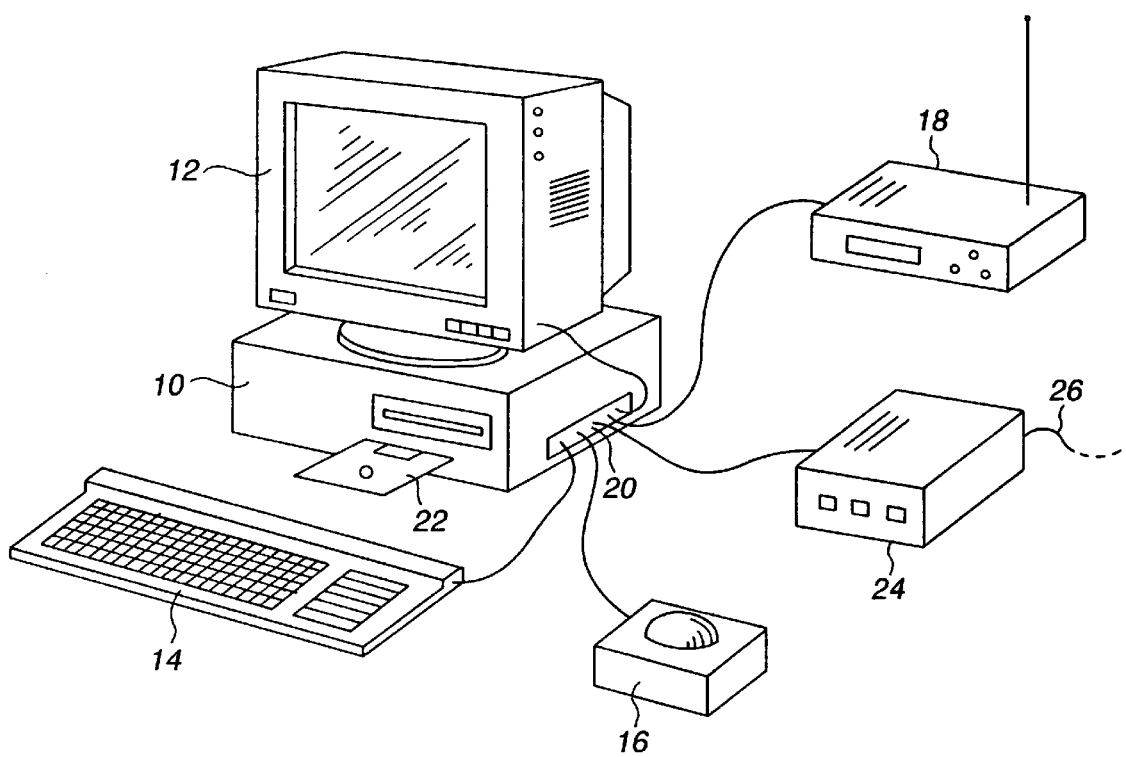
FIG. 1 shows the general hardware arrangement of an embodiment.

As shown in FIG. 1, the apparatus includes an analysis apparatus comprising a personal computer (PC) 10 with specific application programs running under the Microsoft Windows 3.1™ operating system. Therefore, there is a minimum requirement for a 386SX CPU. For 386 or 486 SX/SLC CPUs, a maths co-processor is very desirable. A colour display 12 is provided. All essential functions can be controlled by keyboard 14 if necessary although a mouse or trackerball 16 is recommended. Microsoft Windows 3.1 requires the presence of a compatible DOS. MSDOS 5 or later is recommended. Although a desktop PC is shown, a portable or notebook PC may be more suitable for practical embodiments.

The application programs of the embodiment require a minimum hard disk space of 1 MB. Windows 3.1 requires about 17 MB. For full functionality, the application program requires a minimum of 6 MB of RAM to operate successfully, with 8 MB being desirable. The present embodiment was developed and evaluated on a 386SX 16 MHz machine with a 387 co-processor. This minimum specification is satisfactory for the simultaneous display and analysis of up to 40 records of spectral activity. For the simultaneous comparative analysis of 100 or more of records, a minimum specification of a clock doubled 486 CPU is recommended with a Pentium™ machine being optimal.

When running on the PC, the application program enables the collection, collation & analysis of data on spectral activity, as reported by a from a scanning receiver. The present apparatus is designed for technical surveillance countermeasure work, and accordingly includes a receiver 18 such as the Audiotel Scanlock ECM or Datong Ranger 2+ countersurveillance radio receivers. The present description assumes that the PC is used in conjunction with the Datong Ranger 2+ countermeasures receiver using an appropriate interface between the receiver and the RS232 serial port 20 of the PC.

The combination of a good countersurveillance receiver with a PC running the specific program gives a speed, accuracy and power to the detection of bugging transmitters that is not otherwise available.

The program can be supplied for use with an existing PC 10 and radio receiver 18, for example on a storage device such as a magnetic disc 22 or by a modem 24 communicating with a remote computer via a telephone line 26. The modem can also be used to receive spectral records obtained from a scanning receiver at a remote location.

SOFTWARE STRUCTURE

Figure 2:
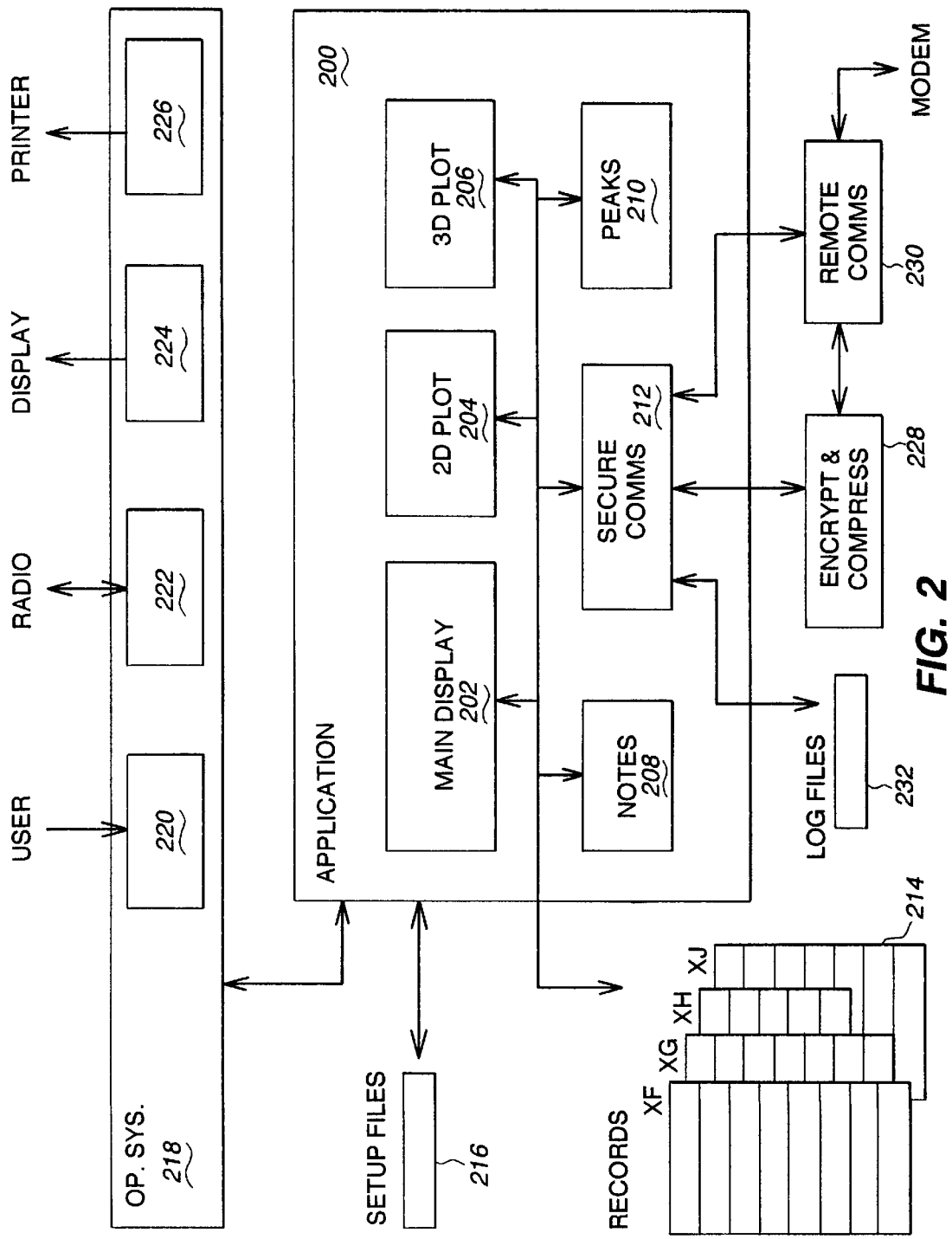
FIG. 2 shows the general software arrangement of an embodiment.

FIG. 2 shows the structure of software arranged within the PC 10 of the apparatus of FIG. 1. The application program 200 is shown in the centre of the diagram, and includes a Main Display module 202, a 2-D plot module 204, a 3-D plot module 206, a Notes module 208, a Peaks module 210 and a secure communications supervising module 212. Together with the application program 200 in the disc and RAM storage of the PC 10 are spectral data records 214, set-up files 216 and the operating system (Microsoft Windows and MSDOS) 218.

The spectral records 214 are stored separately for each of a number of "sites" which have been scanned for bugs, the sites being labelled XF, XG etc. The operating system 218 includes a module 220 for receiving user input by the keyboard 14 and trackball/mouse 16, a serial communication module 222 providing the interface to the radio receiver 18, a display controller 224 for the management of areas display windows, to be displayed on the colour display 12, and a printer driver module 226 allowing hard copy output via a printer (not shown in FIG. 1).

The software structure further comprises an encryption and compression module 228 comprising commercially available software as described below. Also provided is a commercially available remote communications software module 230, also as described below, which provides for the communication via the modem 24.

The various modules of the application program 200 are separately shown for clarity only, since in the practical embodiment these are distinct but integrated functions of a single application program 200. These functions will be described in more detail below. They are implemented readily by a skilled programmer, using for example freely available libraries of programs for mathematics and data handling functions.

THE RADIO RECEIVER

The following description relates to use of the Datong Ranger 2+ countersurveillance receiver. The application program 200 and PC 10 can be configured to work with other receivers, both of the single channel and harmonic scanning types.

The Ranger 2+ receiver scans the spectrum from 1 KHz to 2.0 GHz. For the specific purpose of a rapid detection of covert transmitters at very close range, the receiver listens simultaneously to many different frequencies at the same time. These frequencies are all harmonically linked. This effect is obtained by using a receiver of well-known superheterodyne design but, instead of using the normal clean local oscillator and mixing a very specific local oscillator output with a selectively tuned radio frequency (RF) input, the local oscillator is made both tuneable and 'dirty' (i.e. harmonic rich).

Combining this "dirty" local oscillator with an untuned RF input results in many frequencies being output from the mixer stage that are determined by the tuning of the local oscillator. These intermediate frequencies effectively represent a number of RF frequencies where (as given in the Datong Ranger 2+ User Manual) any RF frequency, $f=n(y) \pm 4500$, where n is an integer and y is the tuned frequency of the local oscillator. In the Ranger 2+, the local oscillator has a 10 MHz tuning range, from 13.5 MHz to 23.5 MHz. This produces a total spectral coverage of 0–2,000 MHz and allows for very rapid scanning.

The Ranger 2+ receiver can store in memory the levels of activity it finds across the spectrum. It does this by breaking the spectrum into two parts, 0–10 MHz and 10–2,000 MHz. The larger upper part of the spectrum is covered by tuning the local oscillator across its 13.5–23.5 MHz range. So, for both parts of the spectrum, the actual tuning range is 10 MHz. For both parts of the spectrum, the receiver subdivides the coverage into approximately 4000 'bins' and, using an A-D converter, stores the level of RF activity it finds in each bin as it scans through it. This level of activity is accorded the digital output value of the converter and will lie on a scale 0–255, producing stored data of approximately 2×8K bytes for the entire coverage.

The value accorded to each bin represents the cumulative activity on many different frequencies that are harmonically linked. This technique makes it impossible to know the actual RF frequency on which the emissive activity is. However, for countersurveillance work and certain other serious activities, this is no disadvantage. The countersurveillance operator only needs to know whether there is a transmitting source in his immediate vicinity and, if so, can he locate it. Knowing the precise frequency of the emission does not help it that task.

Operating in this manner, the receiver 18 can complete a scan of both lower and upper sectors in less than three minutes. The A-D converter works like a pump or ratchet, so that any further scan or part-scan will increase any stored bin value subsequently scanned at a higher level of activity than was earlier recorded. A successive lower value will leave the earlier and higher stored value unchanged. In this way, records of transient signals can be retained undiluted over plural scans.

Having stored this data in memory, the receiver 18 responds to a command from the PC to transfer the data across to the PC for formatting as an MSDOS file and for logical storage. The Ranger 2+ receiver can only store one complete spectral record (upper+lower) at one time. Therefore, this record is downloaded to the PC promptly to avoid it being overwritten the next time the receiver is used.

The "ratchet" feature is particularly useful in the detection of sophisticated bugging devices such as transmitters operating only in "isolated bursts", and also frequency agile or frequency hopping transmitters. Since the receiver is receiving in one frequency bin at a time, covering the entire spectrum over a period of about 30 seconds, in a single scan a frequency agile or burst transmitter might be missed. In the present apparatus, however, it is preferred to allow the receiver to scan several times the entire spectrum, over a period of say 3 minutes, each scan adding to a single spectral record. By virtue of the "ratchet" mechanism, the probability that the frequency agile or burst transmitter will appear clearly in the spectral record is greatly increased, particularly since the harmonic scanner is effectively recording several harmonically related frequencies at each instant.

In fact, when viewing traces recorded over several scans in the presence of a frequency hopping transmitter, the transmitter appears most conspicuously as a distinctive collection of spectral peaks corresponding to some or all frequencies of the "hop set"

SPECTRA

The PC inputs, stores and displays data on levels of electromagnetic activity levels reported by the receiver or other equipment capable of detecting that activity. Though the Ranger 2+ receiver stores its data in two parts, each of which would represent an 8K byte file, the PC 10 combines both parts into a single 8K byte file for its own storage. While doing this, the PC keeps a record of what data belongs to each part, VHF Spectrum and VLF Spectrum, of each complete spectral record.

The PC displays this information as one or more lists, X-Y line graphs, histograms, stacked silhouettes and netted 3-D surface models. Intelligent use of these displays allows a rapid and accurate assessment to be made of RF or mains carrier activity. These assessments can compare activity in various locations, on different dates, at different times, on different days of the week and at different levels of activity.

Both the Datong Ranger 2+ and the Scanlock ECM receivers mentioned above divide the spectrum into an upper and lower part for the purposes of collecting data. Scanlock ECM uses the convention RF (radio frequency) for the upper part and CF (carrier frequency) for the lower part. Ranger 2+ uses the convention VHF (very high frequency) for the upper part and VLF (very low frequency) for the lower part. The present apparatus uses the terms Upper Spectrum and Lower Spectrum, whichever receiver is in use. With either receiver, the Lower Spectrum scale represents the tuned frequency of the receiver, while the scale of the Upper Spectrum represents the tuning range of the receiver's local oscillator.

Figure 3:
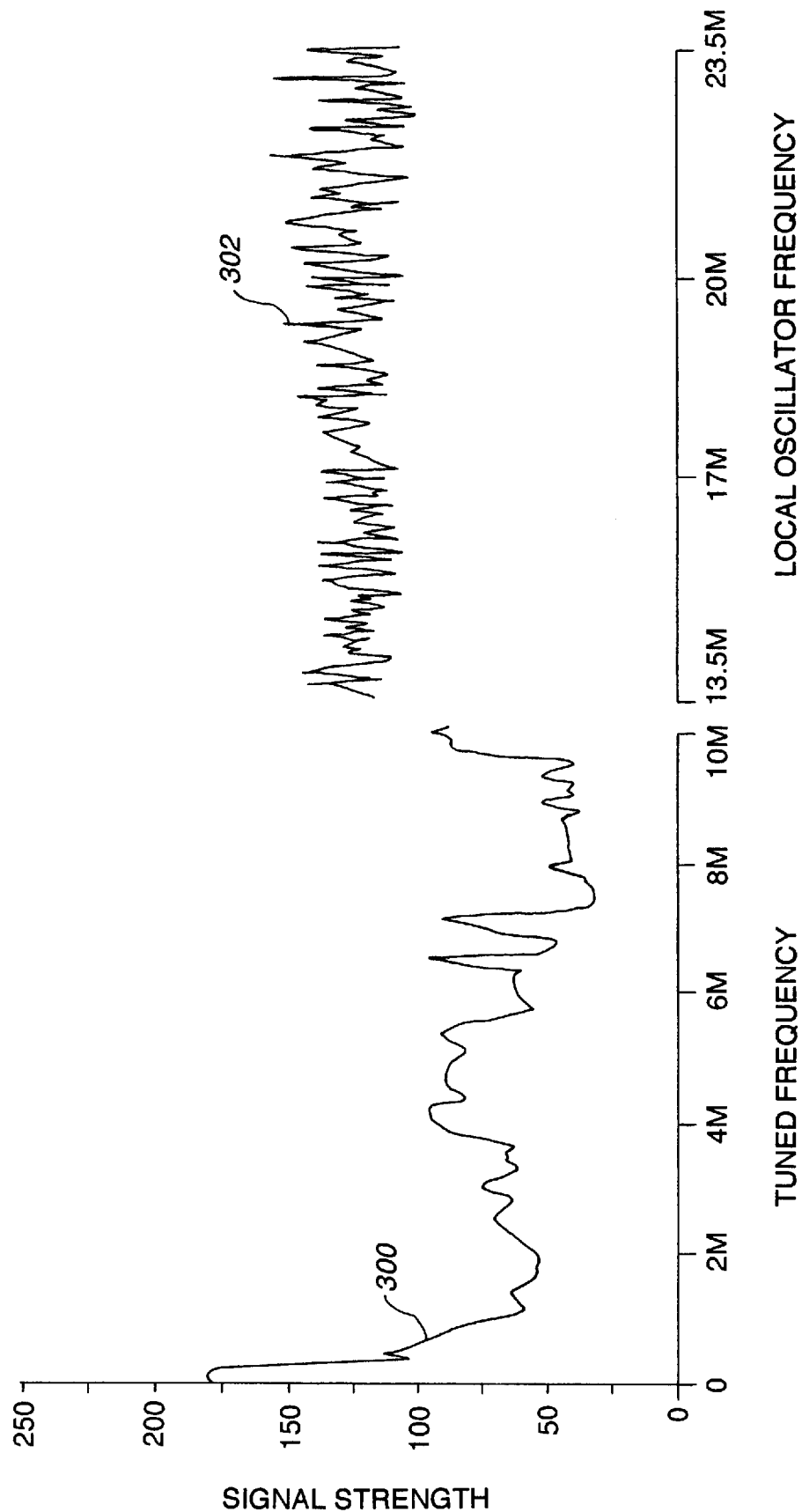
FIG. 3 shows a plot of signal strength against frequency for a complete spectral record (upper part of the spectrum and lower part of the spectrum) in the Main Display window.

FIG. 3 shows a basic display of the two parts of a real spectral record. The PC automatically adjusts the scaling of its displays to conform with the requirements of the receiver with which it is working. Although the PC will display records made from either receiver, records made by different receiver types cannot be mixed together in the same display. However, using two independent main display windows, Ranger and Scanlock records can be screened at the same time.

The scalings used for each receiver are as follows:

|  | Lower | Upper |
| --- | --- | --- |
| Scanlock ECM | 15 KHz–10.3 MHz | 12 MHz–20 MHz |
| Datong Ranger 2+ | 0 KHz–10 MHz | 13.5 MHz–23.5 MHz |

DISPLAY WINDOWS

The PC 10 gives a total of six screen display windows, giving different views of the spectral data.

Figure 7:
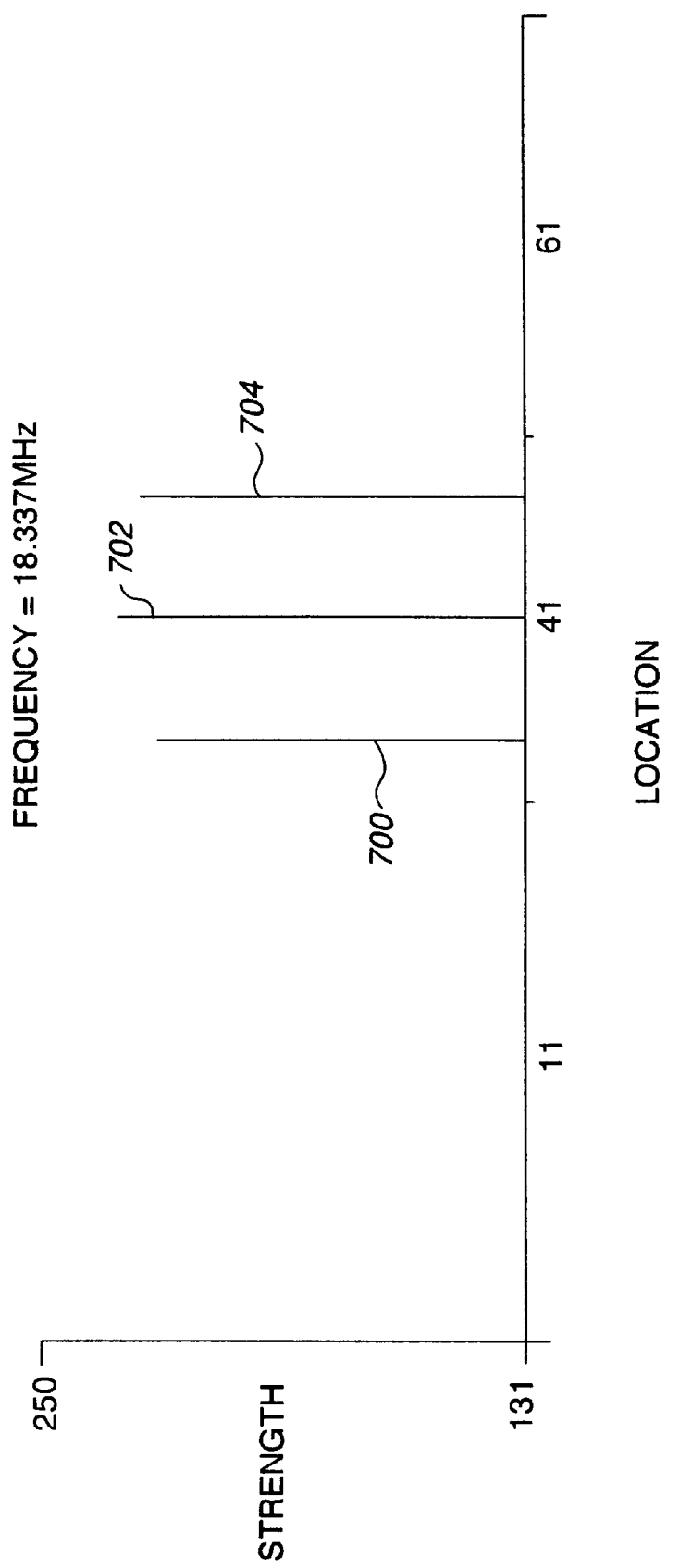
FIG. 7 shows a 2-D slot display of signal strength against location with an appropriate setting of the strength cursor.
Figure 8:
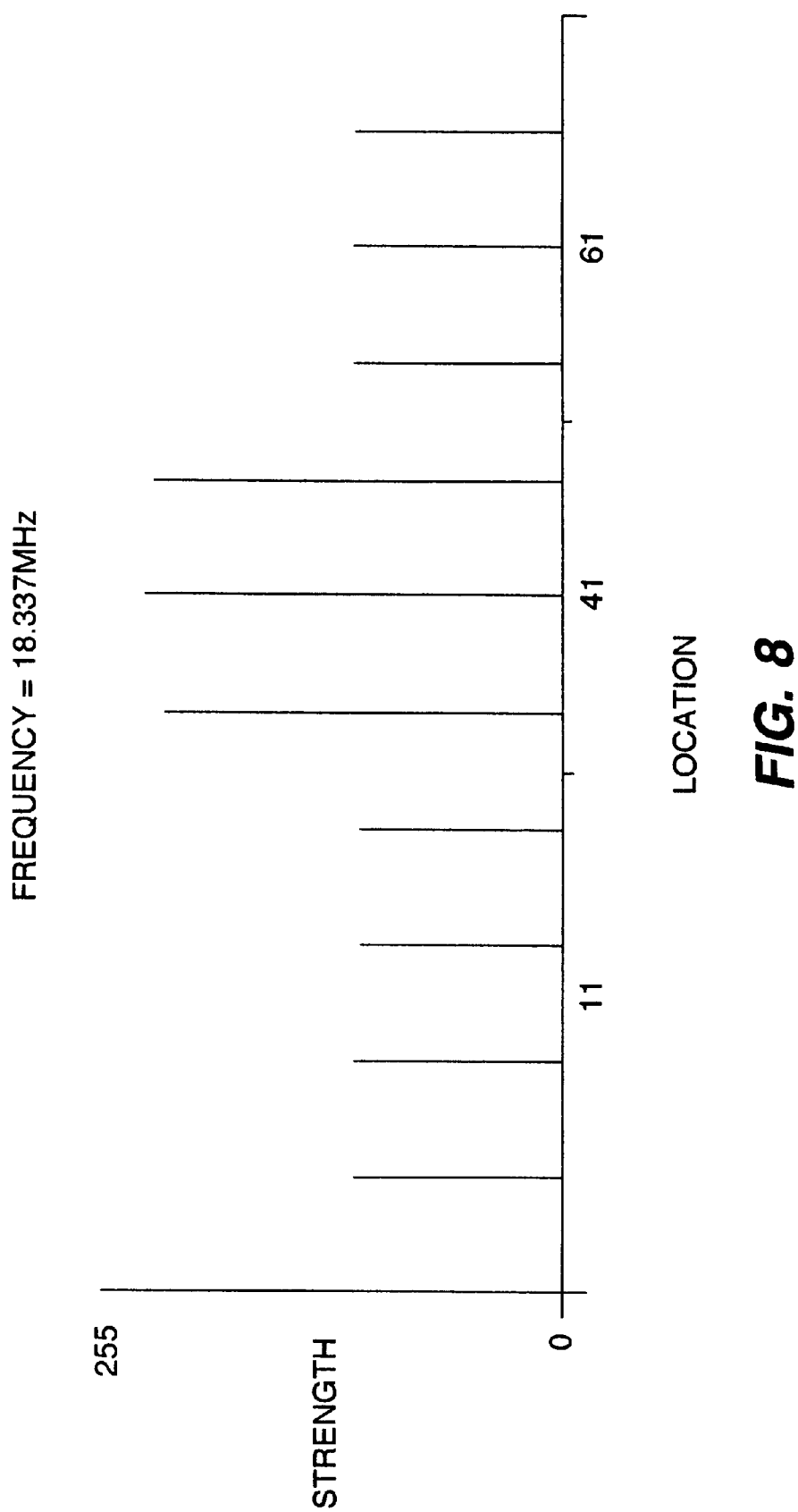
FIG. 8 shows the display of FIG. 7 without a y-zoom setting.

The Main Display window is the window into which all spectral record files are loaded and is the default window on starting the application program 200 on the PC. It is a two-dimensional display that always shows frequency on the x (horizontal) axis and signal strength on the y (vertical) axis. The opening display defaults to dual display of both Upper Spectrum and Lower Spectrum as shown in FIG. 3. Either Upper or Lower display may be then be selected for full screen display The 2-D plot is a subsidiary two dimensional display that provides a powerful analytical tool. Examples are shown in FIGS. 7 and 8.

The 3-D slot allows even hundreds of spectral records to be displayed in three dimensions, allowing visual analysis of spectral activity across a range of locations or over time. Examples are shown in FIGS. 9 to 12.

The Names List window displays a list of the locations, dates and times of all spectral records loaded into the main display. An example is shown in FIG. 13.

The Peaks List is window lists all frequencies that demonstrate peaks of activity above a user specified level in a given spectral record. An example is shown in FIG. 14.

The Notes memo pad is a notepad that allows a text note to be appended to any spectral record (the text note is actually contained within the spectral record file).

The significance of these displays and their uses will become apparent from the following description. In particular, an example operating session relating to FIGS. 3 to 13 will be described toward the end of this description.

BASIC USER CONTROL SYSTEMS-COMMANDS

Menu Commands

The following is a listing of the menu commands available within the application program. A listing of all Main Display commands is given first. This is followed by a listing of additional commands that can be accessed only from a subsidiary display window.

A File menu contains commands Open File, Save File, Delete File, Copy To, Change Sub Dir, Create Sub Dir, Print, Printer Setup, Exit.

An Edit menu contains the commands Copy, Sort Spectra, Discard Current, Discard Spectra, Clear All Spectra.

A Radio menu contains the commands Fetch, Send and Serial Port Settings.

A View menu contains the commands Upper Spectrum, Lower Spectrum, X-Zoom Dble/×1/×10/×50, Y-Zoom, Frequency Cursor, Strength Cursor, Next Spectrum, Colours (Coloured, Coloured+Bold or Monochrome)

A Windows menu contains the commands Show First/Show Second, Select Other, 2D plot, 3D plot, Peaks, Names, Notes, Save Setup, Load Setup, Delete Setup.

A Communications menu contains the commands Set Password & Key (Logon Password Seed fill only, Encryption Key Seed fill only, or Station ID), Send Files Now, Set Timer, View Error Log, View Transfer Log.

There is also a Help menu.

The 2D plot display has a special command Main in the Windows menu.

The 3D plot display has special commands Redraw and Net3D in the View menu, and Main in the Windows menu.

The Peaks List Window has special commands Undo, Cut, Paste, Delete and Clear All in the Edit menu, and Main in the Windows menu. There is also a special Options menu, with commands Peak Size, Sort by Frequency, Sort by Strength and Select Peak.

The Names List display has special commands Delete File, in the File menu and Main in the Windows menu.

The Notes display has special commands Undo, Cut, Paste, Delete and Clear All in the Edit menu, and Main in the Windows menu.

The functions of the above commands will be described in more detail below.

Cursors

The PC provides three cursors for measurement or the setting of levels.

The Frequency Cursor is a fine red line (400 in FIG. 4, 900 in FIG. 9) beside which is a readout 402/902 of the frequency on the x-axis scale to which it is set. This cursor is used in both the Main Display and 3D plot windows. Setting the Frequency Cursor in one window will reset it automatically in the other. The Strength Cursor appears as a horizontal red line in the Main Display window only. Additionally, the current spectrum (see below), can be very usefully regarded as a cursor on the z axis of the 3D plot window.

Each display window can be zoomed and/or scrolled independently. The x-zoom and y-zoom commands control zooming. If a cursor is shown then the window will centre on the cursor in a zoom; otherwise, the window will zoom in on the current view.

Mouse Commands

The same mouse commands work in the present apparatus as will be found in any other Windows™ program. In general:

Clicking once on a menu heading will open its drop down menu.

Clicking once on a menu item will select or deselect that item (blue=selected, white=unselected).

Clicking twice on a menu item will execute that choice (or group of choices if more than one item has been selected).

Dragging can be used to resize and move windows to produce a multi-window display, showing different facets of an analysis simultaneously.

Dragging the scroll bar buttons is used to rotate the 3D plot display in both vertical and horizontal planes. Dragging a scroll bar button is used also to examine more than one screen's contents of Names and Peaks lists.

Dragging with the mouse is also used to set the blue Strength Cursor for Y-zoom.

Pointing & clicking once will set either the Strength Cursor or the Frequency Cursor in the Main Display, or the Frequency Cursor or the z-axis cursor in the 3D plot display.

Keyboard Commands

The keyboard interface for the main window is as follows:

F2: Call Contents page of help file.

F6: Activate the alternate Main Display.

Shift: Change mouse cursor shape to small cross+arrow. This is the precondition to changing the current record by placing the changed cursor over the trace of the desired record and clicking the mouse.

Ctrl: Change mouse cursor shape to triple horizontal bar. This is the precondition to setting y-axis zoom maximum and minimum levels.

Up/Down: Move the strength cursor.

Ctrl-Up

/Down: Move minimum strength blueline cursor.

Left/

Right: Move frequency cursor.

Shift-Up
/Down/Left
/Right: Move strength cursor by 10 steps. Move frequency cursor by a varying number of steps dependent on x-zoom level.

Ctrl-Left
/Right: At x-zoom ×10 or ×50, change the field of view 90% left or right.

Escape: Clear all cursors.

Tab: Select next spectrum as 'current'.

Shift-
Tab: Select previous spectrum as 'current'.

F: Mouse now controls frequency cursor.

S: Mouse now controls strength cursor.

H: Display upper part of loaded spectra.

L: Display lower part of loaded spectra.

PgDn: Zoom in on x axis.

PgUp: Zoom out on x axis.

Ins: Toggle y-zoom setting in/out on y axis.

Ctrl-
Insert: Copy current display to clipboard.

Ctrl-D: Discard current spectrum from display.

Additional keyboard commands available from the Edit Menu command list of some the subsidiary display windows are as follows:

Alt+BkSp: Undo
Shift+Del: Cut
Shift-Ins: Paste
Alt-Ctrl-Del: Clear

THE CURRENT SPECTRUM

One of the spectra loaded into the Main Display window is the 'current spectrum'. By default, this will always be the last record loaded. It is drawn in black (bolded in these drawings and on mono displays, and on colour displays if the Colour+Bold Colour menu option is selected). The name of the 'current spectrum' is shown on the Main Display window title bar. This information is updated as the current record is changed. In the Main Display window, the current spectrum can be changed by either of the following methods:

By placing the cursor on any discrete part of a spectral trace that it is wished to make the current record, holding down the Shift key and clicking the mouse. (The cursor changes shape when the shift key is held down).

By using the Next Spectrum command. Pressing Tab or Shift-Tab changes the record labelled as current either forwards or backwards in the order of presentation.

If the user chooses Save File, the 'current' spectrum is saved to a file. With a Ranger 2+ receiver, if the user chooses Send, the 'current' spectrum is sent to the memory store in the receiver. This feature is not available with the Scanlock receiver.

Peaks of spectral activity above a user set threshold are listed for the current spectrum in the Peaks List window when that display is opened.

The current spectrum (displayed in black) can also by used as a z axis cursor in the 3D plot window, using the pointer and mouse to set it. Any setting of the current spectrum in the 3-D plot display window will reset it in the Main Display, 2-D plot, Notes and Names List display windows also.

The current record selection may also be changed from within the Names List and 2-D plot windows. In both cases, simply place the cursor over the desired record and click with the mouse. Similarly, this change made in one display window updates all other windows.

A text note can be attached to any current record, to save information of interest in a fixed association with the appropriate spectral record. The Notes display always opens at the 'page' for the current record.

NAMING OR SELECTING A 'SITE'

In the present embodiment, files, i.e. spectral records, belong irrevocably to a Site. A Site is one contiguous area, normally (but not exclusively) a building, within which one or more locations (normally rooms) are to be or have been 'swept', or scanned for surveillance transmitters.

A Site can be named by any suitable group of letters in upper of lower case. Many users will find it practical and useful to refer to Sites by a two or three letter code that is meaningless to any other party. For example banks might carry a prefix of X and then be listed in random order by an identifying suffix letter. In this way, were the Bank of England a listed site, it could appear in the Site list as XF. Once a site name has been attached to a spectral record it cannot be changed.

Select Site command displays a list of only those sites whose files are kept in the current directory. Users who service more than one site and collect a substantial number of spectral records over time will find it useful — particularly for archiving purposes—to keep records for each site in their own sub-directory. The Create Sub Dir and Change Sub Dir commands are provided for creating and changing subdirectories.

The present embodiment does not allow spectra from different sites to be combined in the same display as such a mixture would be meaningless. Neither can spectral records from one site be saved as though they were records of another site. Were records from different sites to become mixed, the whole data set could become worthless.

When either first opening a file in an operating session, or else saving a spectral record downloaded into an empty Main Display, the user is asked to select a Site to draw a record from or add a record to. Having specified the site, the user must then specify a Location, at which the record was made, within the Site. A location is identified by a number from 1 to 99. Large locations, such as a boardroom in a corporate building, may require that the receiver should scan at several points within them. In this case, these sub-locations may be further identified by adding a lower case letter from a to i to the one or two digit location identifier. Date and time stamping of records is automatic according to the time of up-loading the record from the receiver to the PC.

USING TWO INDEPENDENT MAIN DISPLAY SCREENS

As mentioned already, only records belonging to a single site can be loaded into the Main Display window at one time. However, there are occasions where a basic comparison of activity levels in different sites would be of some particular value.

Figure 15:
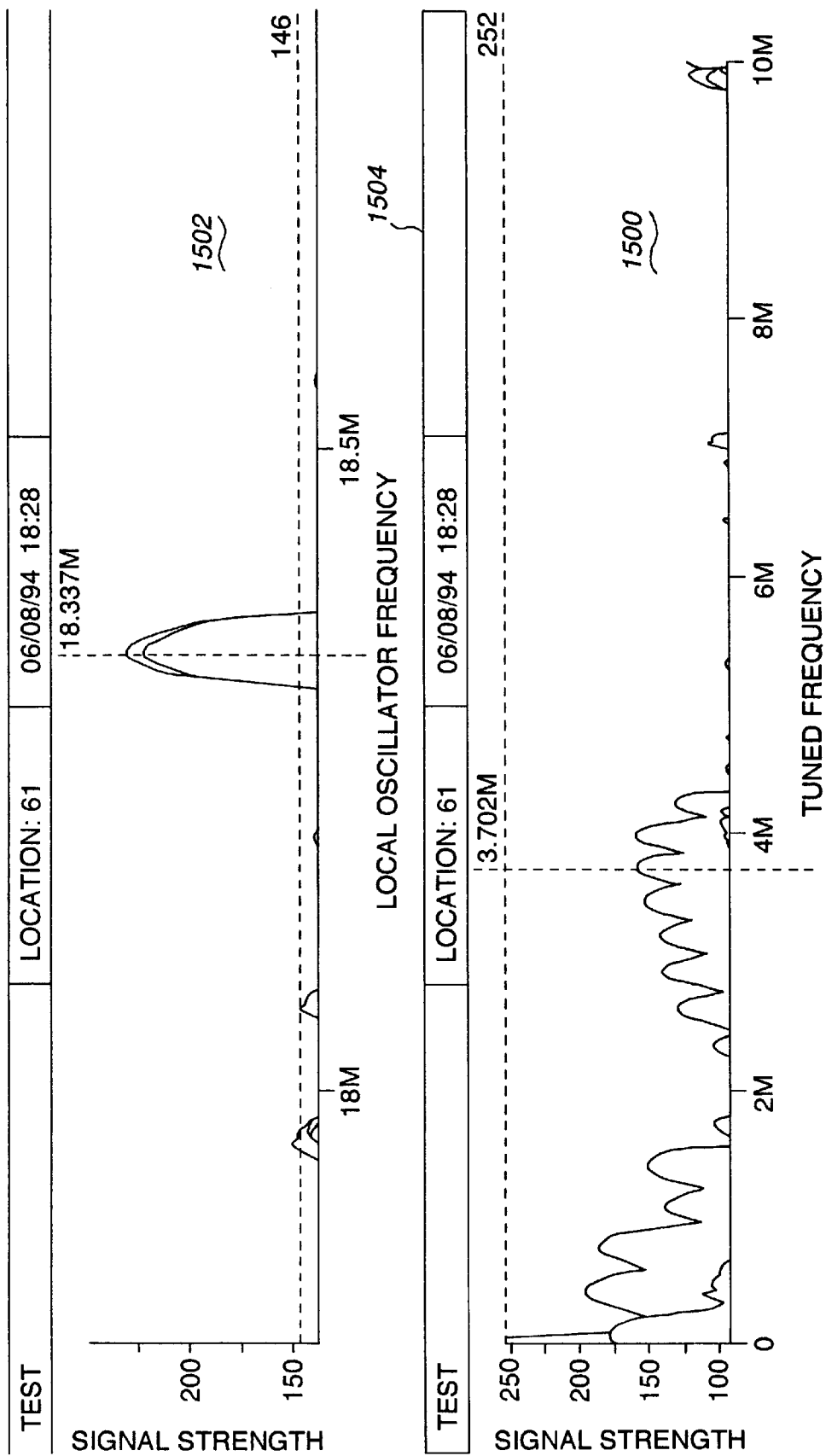
FIG. 15 shows a split screen display for two independent Main Display windows, the independent windows corresponding to the upper and lower spectra.

Therefore, as shown in FIG. 15, this embodiment has also a split screen mode of working, in which two independent main Display windows 1500 and 1502 are created. These two windows are mad e and activated with the commands Show First/Show Second and Select Other. Only one window can be active at one time. To change the active window, the user can either click the mouse cursor over the desired window or use the Select Other menu command. The active window 1500 is indicated visually by blue highlighting of its title bar 1504.

Into each of these two Main Display windows can be loaded spectral records from a different site. Alternatively, as shown in FIG. 15, the Upper Spectrum and Lower Spectrum records for a single site may be simultaneously displayed and manipulated.

If a multiple display setup is screened and then the Main Display is changed to split window working by using the Show Second menu command with an independent display of records loaded into the second window, the information displayed in all the subsidiary windows that are open in the setup will change to the appropriate data set as the active window in the Main Display is changed.

The current spectrum in either window can be saved to a file with the Save File command when the window is active. The record saved will be stored in the sub-directory of the record set displayed in that window. The directory will be shown in the Save File dialogue box.

MULTI-PANE SETUPS

Using these set-up files (216 in FIG. 2), PC 10 can permanently store and recall varying combinations of the six information displays in one multi-pane screen. The displays are fully interlinked and altering the content of any one will automatically update the content of the others as appropriate.

This feature allows a user to view the same data in different ways at the same time. Particularly when the PC 10 is a small screen portable PC, the graphical displays seen in this manner may be too small to be useful for some purposes. However, by using the usual Maximise and Minimise buttons in each pane frame, any pane in a multi-pane display may be popped up to full screen for working on and then popped back into the multi-pane display.

REMOTE DATA ANALYSIS FEATURES-COMMUNICATIONS MODULE

Using the modem 24 in FIG. 1, a remote analysis service can be provided using the present apparatus that allows the electromagnetic environment of specified rooms to be expertly checked on a monthly, weekly or even daily basis, quickly, cheaply and effectively without bringing expensive specialist personnel to the site.

For this service, the sully integrated communications module 212 in the PC application program 200 enables spectral records collected at a contracting site to be transmitted off-site, securely, simply and over a standard telephone circuit, to a centralised facility offering rapid and expert analysis of all site data. A higher level of counter-electronic eavesdropping assurance can thus be maintained in sensitive areas which are frequently visited by outsiders than has previously been practical. Also, sites anywhere in the world can be expertly checked out before VIP occupation at little or no notice.

An explanation of the secure communication concepts and the main functions follows. Full details of the communications menu commands (listed already above) are not included herein, for the sake of brevity.

The communications module 212 (together with modules 228 and 230)entirely automates the processes of file handling, transaction log keeping and management of a secure transfer of data between remote sites. If required the entire process will run unattended. Central to the concept of the operation of the remote data analysis service is that of a network, where there is one central pool of analytical expertise (the "Control Station") and many remote sites ("Outstations") where data is collected and first stored in an embodiment of the present apparatus. The control station employs a similar PC 10 and application program 200, but a radio receiver 18 would be redundant at the control station.

Each outstation is given a unique communications identifier (station ID). Use of these unique identifiers allows the control station to sort incoming data correctly, regardless of how many outstations there may be. Communication between outstations is not permitted, even were outstations aware of each other's existence and details. For best security, communications are strictly one-way i.e. from outstation to control station. Other than with manual override at an outstation, the communications software at the outstation will not respond to any incoming calls.

The following functions take place under control of the secure communications module 212: file handling at the outstation; files compression & encryption before transmission; automated opening of a logon password secured communications link to the control station. After automated checking of the integrity of received data at the control station, a 'success' signal is returned to the sending outstation, the communications link closed and a duplicate transfer log entry made at both control and outstation.

For each files transfer session, the files are first encrypted and compressed at 228 before transmission. The encryption uses a one-time only key. These keys are generated at the outstation and, during a files transfer, the encryption key to be used by that Station ID for the next files transfer session is passed to the control station in encrypted form. In this way, the control station always knows what encryption keys to associate with incoming traffic from any Station ID. Apart from the generation of one time only encryption keys, the actual files' compression, encryption and the reverse processes can be carried out by the module 228, for example the widely used PKWare Inc. ZIP utility program. PKZIP is copyright 1989–1993 PKWARE Inc. U.S. Pat. No. 5,051,745

The very first encryption key for an outstation is supplied by the control station and must be set by hand. This process is known as 'seeding'. Once the system has been seeded and the first files transfer successfully effected, all further generation of encryption keys is fully automated and is transparent to the user.

Seeding the system should will be done by control station personnel. After the first successful files transfer, the encryption keys cannot be read at the outstation, the appropriate space in the Set Password & Key dialogue box appearing empty. However they can be read at the secure control station, so that fault conditions can be diagnosed.

In FIG. 1, the modem 24 is for example a US Robotics Courier v32bis/fax modem, and the remote communications module 230 is a standard communications software package such as Procomm+ for Windows. These facilitate both attended and unattended communication sessions, including a secure logon procedure. The module 230 and modem 24 are capable of fax as well as data communications and handle the actual communications sessions as instructed by the Communications Module 212.

The station IDs are usually permanently assigned and have no security significance. They cannot be faked by a third party as the control station knows what Logon Password and Encryption Key will next be used by each station ID. If there is a mismatch between the ID and either or both of the Logon Password and Encryption Key, then the attempted files transfer is refused by the control station.

USING THE APPARATUS

There follows a description of the operation of the analysis apparatus (PC 10 and application program 200), firstly by reference to specific menu commands (listed already above), and secondly by reference to an example analysis session. Finally, use of the apparatus to provide a remove analysis service will be described.

MAIN DISPLAY COMMANDS

The File Open command allows the user to load additional spectra into the display window for comparison with the "current" spectrum. The current spectrum is always shown in black and, by default, is the last file loaded.

The File/Open dialogue allows the user to read all the spectra, or just groups of spectra pertaining to one specified site. Example groups are: all the locations; all the dates; by day of week e.g. every Wednesday; all the times; and any time between 14:00 and 14:59. They are appended to the spectrum list in the order in which they are read.

Both parts of the spectral record are initially shown in one Main Display window (FIG. 3). The user then chooses which part he wishes to work on first and clicks the pointer over it to show a frequency cursor. If many records are to be loaded, this can waste considerable time. The process of record loading can be greatly speeded up if it is known what part of the spectrum requires detailed examination. The loading process may be halted by clicking the frequency cursor on the display while the loading process is running which will then allow the user to reselect upper or lower spectrum, x-Zoom ×10 or x-Zoom ×50 this will cause loading to recommence zoomed around the cursor setting and speeded up.

Having been downloaded from a receiver, a spectral record becomes the current spectrum in the Main Display. This record can now be saved as a file using the Save File command. Each individual apparatus creates its own filenames in consecutive order and will not produce duplicate records. The file prefix consists of eight alphanumeric characters. The first four characters give a unique identity to files made by a specific apparatus. The last four characters give the serial numbering of the files in base 26 arithmetic, so that 456,976 (=$26^4$) unique records can be filed by a single apparatus and subsequently be identified and retrieved from storage without error.

While filenames are generated automatically by the system, a user selects a file (a spectral record) by the site, location and date of that spectral record. Spectral records may be selected individually, or by selected groups or all records together for a specified site.

The File menu commands Delete File, Copy to, Create Sub Dir, Change Sub Dir, Printer Setup and Exit will be selfexplanatory to the reader familiar with Windows and similar computer operating environments.

The Print command copies the contents of a display window to the printer. Any printer supported by a user's installation of Windows 3.1 or 3.11 may be used. If two Main Display windows are shown, either just the active window or both windows can be printed. 2D plot, 3D plot, Names List and Peaks List windows have their own Print command and are printed singly (as shown in the accompanying drawings), even if in a simultaneous display. Multi-pane setups cannot be printed.

Copy is an Edit menu command which copies the contents of the current window to the Windows 3.1 clipboard, from where it may be pasted into a document created in another application program, such as a word processor. The entire contents of multi-pane setup cannot be copied to the clipboard, only that of the active window.

Sort Spectra on the Edit menu is used to sort and order all spectral records in the Main, 2-D plot, 3-D plot and Names List displays. The default presentation is to list/show spectral records in the order that their files were loaded into the display. Sort Spectra allows records to be sorted into:

Location order (example: FIG. 7 and FIG. 8). This is the most commonly useful sort and is often the order selected for initial loading.

Figure 17:
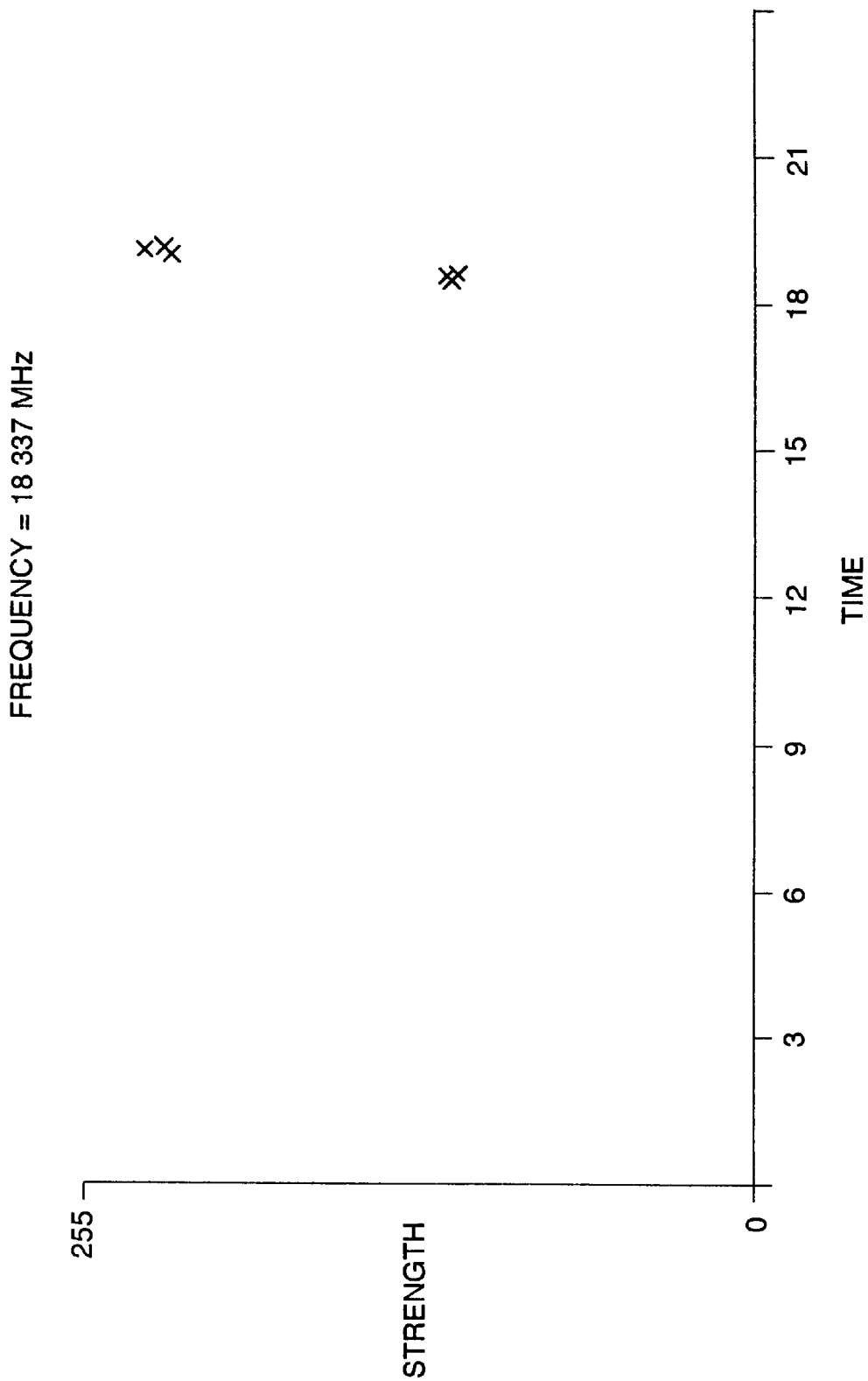
FIG. 17 shows a 2-D plot display of signal strength against time of day for a given frequency.

Strict 24 hr time order, regardless of date (example: FIG. 17). This sort allows the user to rapidly identify activity that occurs repeatedly between the same times of day.

Figure 18:
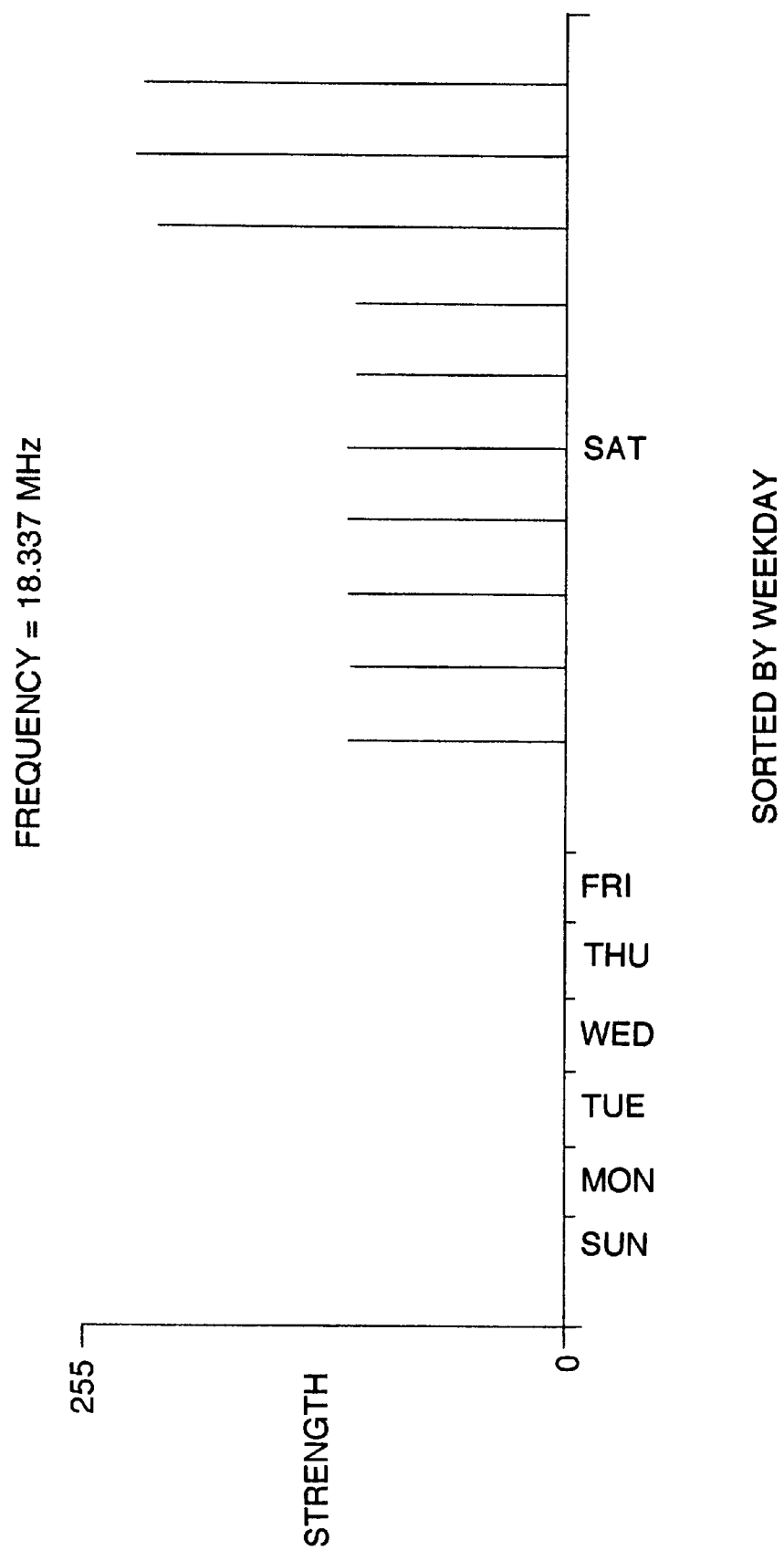
FIG. 18 shows a 2-D plot display of signal strength against weekday for a given frequency, the size of the day "bins" being automatically set according to the number of records in each bin.

Weekday (example: FIG. 18). This allows a sort that places for example all Monday spectral records together, allowing easy identification of spectral activity only present on a certain day of the week. This sort may be further sub-divided to display only records made within a specified hour on a given weekday.

Figure 19:
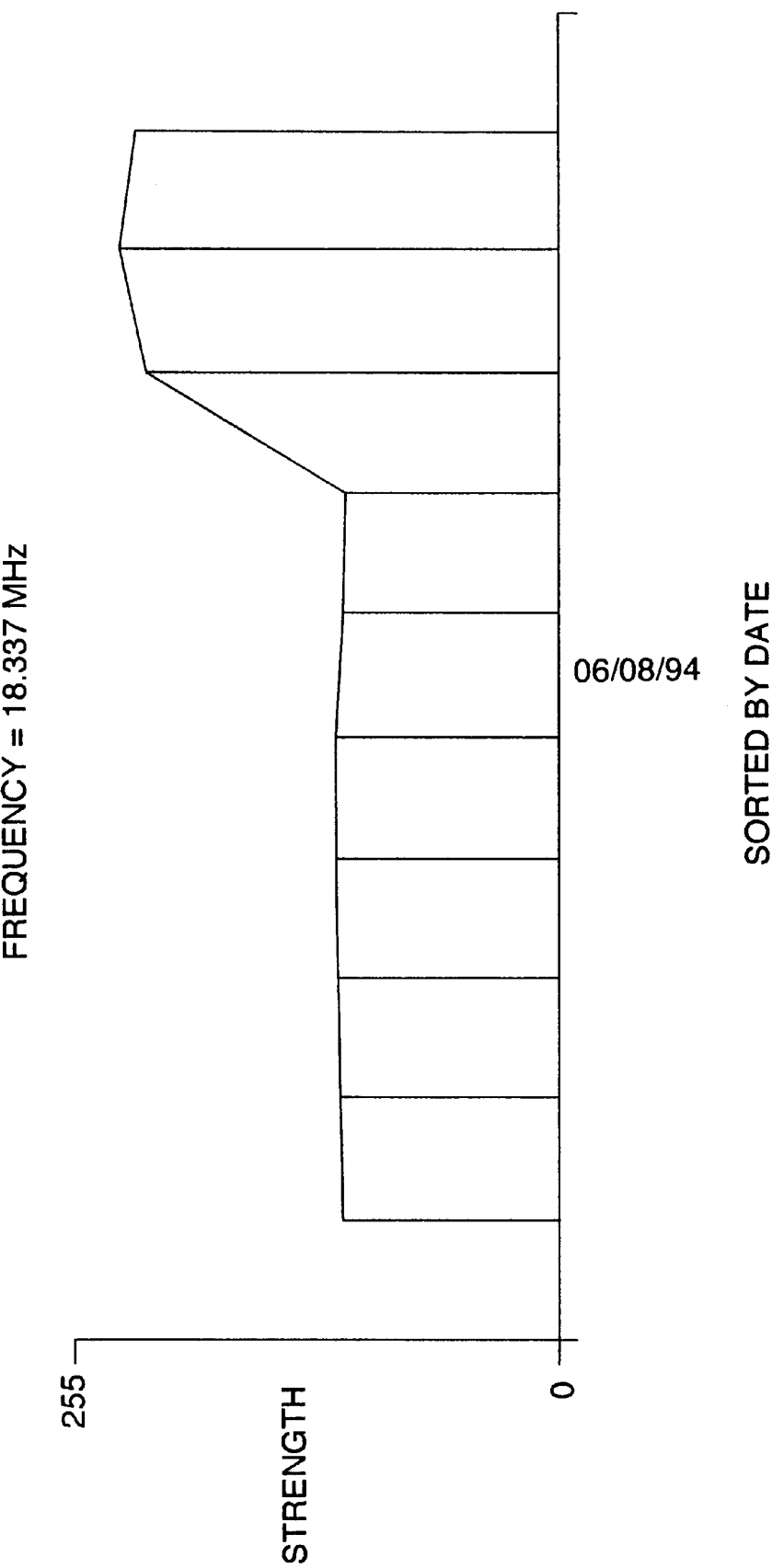
FIG. 19 shows a 2-D plot display of signal strength against date for a given frequency.

Date order, ordered by time within a date (example: FIG. 19). This allows easy appreciation of changes in spectral activity over an extended period of time.

Strength. Sorting spectral records into strength order allows easy appreciation of whether or not a signal decays uniformly as distance increases from a given location (i.e. there is an emitting source within a given location.

The details of all spectral record files are displayed during a Sort Spectra operation and particular records may be specified for discarding before a sort of the remainder takes place. This is useful to refine a clear presentation by going through several sorts, removing gradually what is irrelevant.

Discard Current on the Edit Menu removes from all open display windows the current spectral record (current spectrum). The record is not deleted and may be re-displayed at any time, unless it has just been downloaded from the receiver and has not been saved before discarding. When the current spectrum is discarded, the next spectral record in the sequence of loading becomes the current spectrum and changes its colour to black. Discarding spectra can be a useful way of simplifying a complex display so that anomalous activity can clearly be identified. However, care should be taken not to discard relevant information simply because it is 'inconvenient'.

Discard Spectra allows a user to select several spectral records in a display window and remove them all at once from the display. Discard All clears all the spectra from all display windows, leaving the windows blank.

The command Fetch on the Radio menu automatically downloads a complete spectral record, consisting of both Upper and Lower parts, to the PC 10 when connected to a receiver 18 such as the Audiotel Scanlock EC or Datong Ranger 2+ receiver. The apparatus can of course be adapted to support communications with different equipment. The applications program 200 will automatically convert the data to an internal file format from the pseudo-ASCII data stream that is output by the receiver 18.

The downloaded spectral record can then be saved. The Save File command (described above) saves both parts of the spectral record in a single file. In doing this the amount of disk storage space required is reduced by 50% while still allowing a user to display and manipulate only the Upper or Lower part of the record, as desired.

The Send command automatically uploads from the PC to the radio 18 a complete spectral record for the current spectrum. Both parts of the spectral record are uploaded even though only the upper or lower part of the complete record may be showing in the Main Display window. The PC will automatically convert the spectral data from its own file format to the pseudo-ASCII data format that the Ranger 2+ receiver needs. Send does not operate with the Scanlock ECM receiver.

The Settings command on the Radio menu allows a user to alter the serial port communications parameters for passing data to/from a scanning receiver. For example, the serial (COM) port to be used can be selected and the baud rate, data bit, stop bit and parity bit settings. The default settings are 4800,8,N,1 for the Datong Ranger 2+ receiver.

Using the Upper Spectrum command on the View menu causes the data sets to be loaded that display all radio activity from 10 MHz to 2,000 MHz. For the 10–2,000 MHz part of the spectrum, the Ranger 2+ records spectral activity as a series of readings across the tuned range of its local oscillator, which is 13.5–23.5 MHz. For the Scanlock ECM, the local oscillator range is 12 MHz-20 MHz. Therefore, the frequency range shown on the x axis is labelled as local oscillator frequency. For details on the working of the Ranger 2+ or Scanlock ECM receiver, see the relevant user manual (both incorporated herein by reference).

Using the Lower Spectrum command on the View menu causes only the 0–10 MHz parts of spectral records loaded into memory to be displayed. For the lower part of the spectrum, the receiver records spectral activity as a series of readings across the tuned range 15 KHz-10.3 MHz for the Scanlock ECM and 0–10 MHz for the Ranger 2+ and this reflects the tuned frequency of the receiver. The frequency range shown on the x axis is labelled accordingly.

It is possible to display both Upper and Lower spectral traces simultaneously, but only in different windows and by use of the Show First/Show Second command to create a split screen display of two independent windows, as shown in FIG. 15. Similarly, Upper or Lower spectral traces from different sites can be compared using the split screen facility. Control can be toggled between these independent windows by use of the Select Other command.

The first window (1502 at top of screen in FIG. 15) is the default Main Display window. Selecting Show Second will cause the second window 1500 to appear in the bottom half of the screen. The second window is then made active by placing the pointer over it and clicking with the mouse. That this screen is active is shown by the coloured caption bar 1504 in FIG. 15. The second window may then be loaded and manipulated in exactly the same manner as for the first window. Placing the pointer over first window and clicking the mouse causes the first window to become active again. The caption bar colours as the caption bar for the second window clears. No further manipulation of the second window is then possible until control is returned to it.

As noted above, any of the subsidiary windows can only be used in conjunction with one split screen Main Display window. With subsidiary windows open, switching control to a second Main Display window will automatically minimize subsidiary windows that are open. On maximizing the subsidiary displays, their content is redrawn appropriately to the content of the second display.

X-zoom on the View menu enables various levels of 'magnification' to be set. This allows any part of a spectral record to be examined in as much detail as may be required. The practical limitation on x-zoom is determined by the radio receiver's scan grain. There are four levels of x-zoom available.

X-zoom Double is the default setting, into which records are fetched from the radio. This view will allow a cursory examination of both parts of a spectral record as it is loaded, so that any gross anomaly can be noted and let the user determine which part of the spectrum should first be subjected to detailed examination. Neither 2-D nor 3-D plots are available with this setting selected.

X-zoom ×1 display shows either the upper trace or the lower trace over its entire frequency scale. ×1 zoom is most useful for gaining a general impression of background electromagnetic activity right across the section of the spectrum under examination. At this zoom level, 2D and 3D plots become available but the 3D plot display will draw fairly slowly as it is interpreting a large amount of information.

X-zoom ×10 is the most generally used zoom level. Traces are drawn ten times faster than at ×1 and sometimes confusing detail is excluded from the examination of a specific signal.

X-zoom ×50 allows the greatest degree of isolation of an anomalous activity and redraws the fastest. However it gives a very narrow view of spectral activity and should only be used after the broader picture has been examined carefully.

At either ×10 or ×50 zoom settings, the entire display may quickly be stepped through a screen at a time by holding down the Ctrl key and press either the left or right cursor keys. Each time the cursor key is pressed the screen shifts almost 1/10th or 1/50th to the left or right. In practice the shift is only 90% of the zoom factor, so that there is a small overlap in displayed traces. X-zoom in or out to any level can be selected from the View menu, or by using the Page Up/Page Down keys to alter the x-zoom level.

Y-Zoom is a view menu command which enables removal of irrelevant 'noise' from the spectral displays, allowing a user's attention to be focused on the small amount of information that will determine the presence or absence of a bug.

In preparation for a y-zoom operation it is necessary to set a maximum and a minimum for the y axis. This is done by pointing and clicking on the desired maximum level desired, so that the redline strength cursor appears at that level, then holding down the Ctrl key, while dragging the mouse downwards. The strength cursor appears to turn blue and, as the mouse moves downward, a second blueline separates from the first and follows the downward mouse movement to the minimum level to which it is wished to set the y axis. This level can usefully be set just below the general level of background noise, ignoring occasional strong peaks.

With the limits thus set, clicking on y-zoom will redraw the display showing only those parts of spectral traces whose signal strength lies between the user set values. Alternatively, Y-zoom may very conveniently be toggled in and out by pressing the Ins (insert) key. Y axis maxima and minima may only be set in the Main Display window. However y-zoom may be toggled in and out from any of the Main, 2D or 3D windows. The redline strength cursor may still be used at any y-zoom setting.

Frequency Cursor is a View menu command which produces a vertical redline cursor (400 in FIG. 4) that can be set to read out the frequency at any point along the x axis of a spectral trace. The frequency readout is displayed (at 402) near the top of the cursor. X-Zoom in or out in the Main Display window will operate centred on the frequency at which the frequency cursor is set. The frequency cursor setting is automatically repeated into the 3D plot window (900, 902 in FIG. 9). Conversely, a resetting of the frequency cursor in the 3D plot window will modify the Main Display.

Setting the frequency cursor is the means of directing the subsidiary 2D plot display window.

The frequency cursor can be set from within any of the Main Display window, the 3D plot window and the Peaks list. Resetting the frequency cursor in any one display will automatically update its setting in the others.

Figure 4:
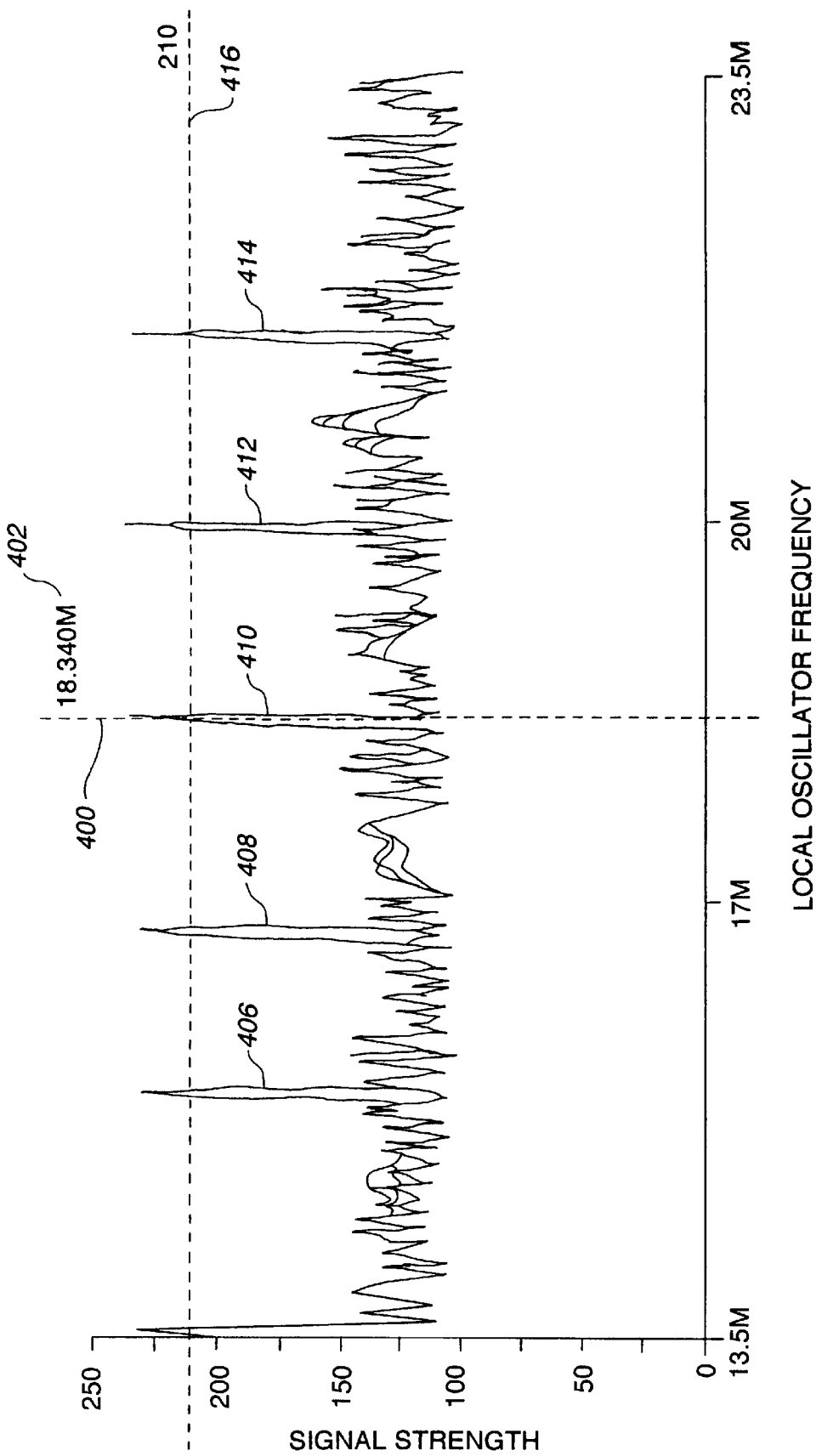
FIG. 4 shows the upper part of the spectrum in the Main Display window for plural spectral records.

Selecting the Strength Cursor command from the View menu produces a horizontal redline cursor (dotted line in FIG. 4) that can be set to read out the signal strength of the level of activity at which it is set (210 in FIG. 4). The setting value is displayed at the right hand end of the cursor. Setting the strength cursor may or may not be a precursor to setting a y-Zoom. Even in a y-axis zoomed display, a redline strength cursor may be set to measure the amplitude of any peak.

Control can be toggled between the strength cursor and the frequency cursor either by clicking on the appropriate View menu selection or by pressing, as appropriate, F or S on the keyboard. As F or S is selected, the cross will change shape to give either a vertical exaggeration (F) or a horizontal exaggeration (S). Thus the shape of the cross indicates to a user which cursor, frequency or strength, is presently under keyboard and mouse control. Either cursor may be set by pointing and clicking or by using the keyboard cursor controls.

The strength cursor is only available in the Main Display window and can only be set from within that display when it is active.

Selecting the Next Spectrum command from the View menu moves forward one place in the loading order the spectral record defined as the current record. Holding down the Shift key while either using the Tab key or clicking on Next Spectrum will move the current record selection back one place in the loading order rather than forward. The Next Spectrum command can be selected from the Main Display window, 2D plot display or the 3D plot display.

In the 3D plot display (example FIG. 9), the current record acts as the z axis cursor and can be redefined as any record in the display without need to step through intermediate records. This is achieved by placing the cross of the pointer just off the z-axis end of the trace that it is desired to make the current record, and clicking with the mouse. The mouse can also be used to select any desired record as the current spectrum is also available in the Main Display, 2D plot and Names List displays. All displays are interactively linked. Changing the current record in any one automatically updates the others.

The application program can be used in conjunction with colour or monochrome displays, assisted by the Colours command on the View menu. With the colour option, the traces and listings of different spectral records are drawn in different colours to assist in distinguishing between them. The current record is always shown in black. With the monochrome option selected, the current record trace (and z axis cursor) is drawn in bold, standing out well from any other trace. Particularly when many traces are loaded, the facility to improve the visibility of the current record (z axis cursor) is also very useful in a colour display. Therefore, the Colours command includes the option to menu select Colour+Bold.

2D PLOT: WINDOW MENU COMMAND

The 2D plot display (examples FIGS. 7,8,17,18,19) is a section through the 3D plot display at the current frequency cursor setting. The Sort Spectra command can be used alter the parameter of the horizontal (z) axis, changing the plot so that the reported signal strengths for the selected (current) frequency are plotted against date, weekday, time or location. All the sorts use a vertical bar histogram as the display medium, except for the time sort (FIG. 17), for which a scattergraph is used, and the date sort (FIG. 19), for which a combination of line graph and histogram are used.

The 2D plot display window provides a most powerful analytical tool, as it reports levels of activity on a specific frequency against the sort criteria specified. It would, for example, show instantly if the level of activity on a specific frequency was much higher in one location than in any other. This would be typical of a bug or some other form of local emission. A signal emanating from outside the building would give approximately the same reading when measured across quite a wide range of locations.

3D PLOT: WINDOW MENU COMMAND

Figure 20:
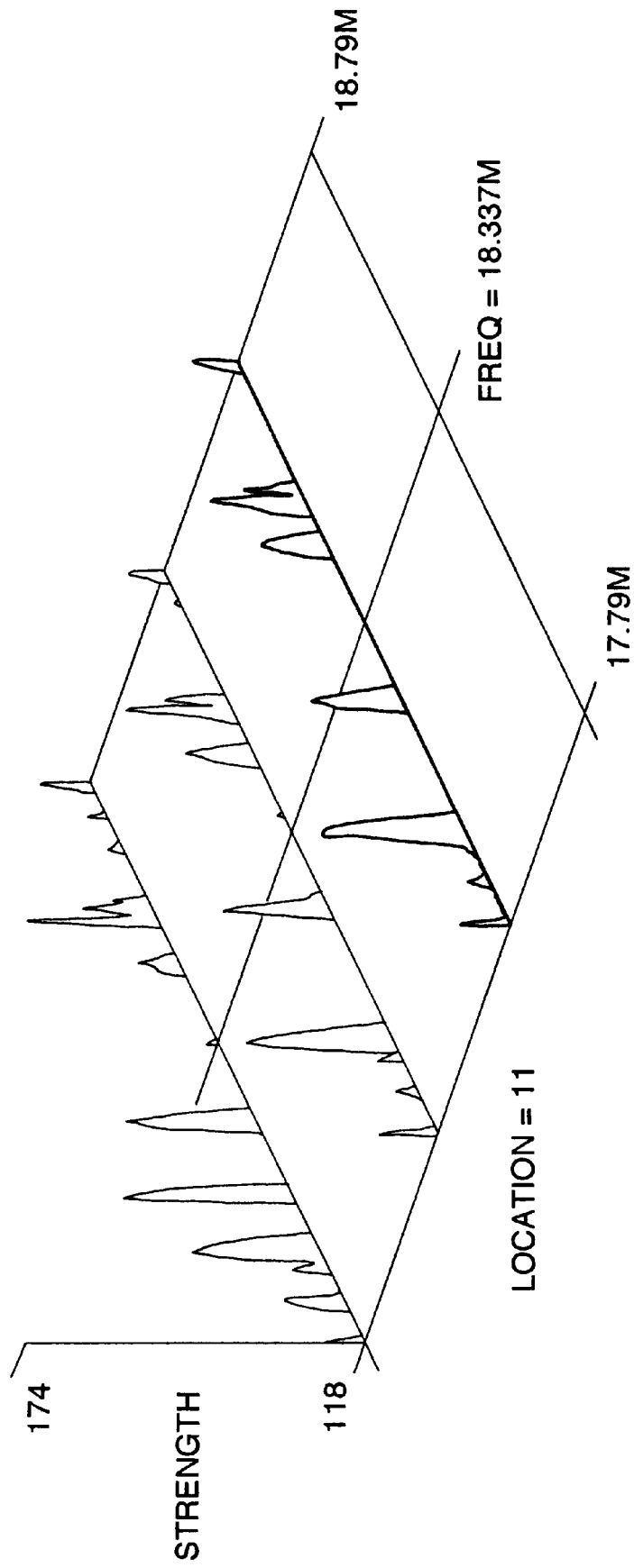
FIG. 20 shows a 3-D plot display for signals from one location (location 11) with maximum and minimum strength cursors set.
Figure 21:
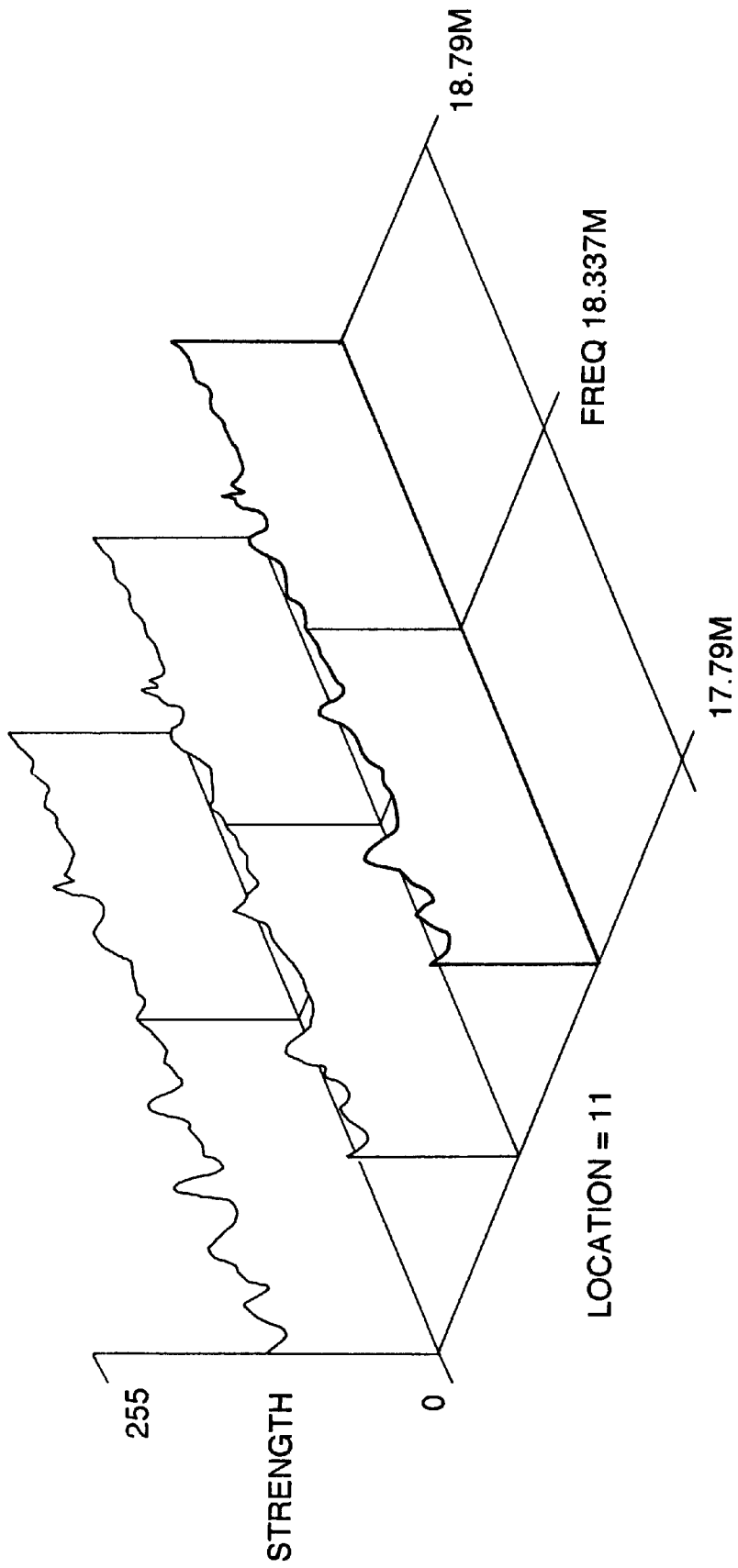
FIG. 21 shows a 3-D plot display in "stacked silhouette" form for signals from one location (location 11).

The 3D plot display interlinks discrete spectral records to give a netted surface display (examples: FIGS. 9,10,11,12, 16) or offers a display of stacked 2-D silhouettes (FIGS. 20,21). These options are toggled by the Net 3D command, with a netted display being the default setting. A netted display, giving a true 3-D image of spectral activity over frequency and time or space is the more useful if more than about eight records are loaded into the display. The more records there are in the display, the finer the grain of the 3-D modelling of spectral activity. Below about eight records loaded the grain becomes sufficiently coarse for stacked silhouettes to offer the more meaningful display.

The x axis always displays frequency. The current x-Zoom setting in the Main Display window determines how much is shown of the x axis of the 3D plot. There is a redline frequency cursor that, when the content of 3D plot window is first drawn, will read the same as the frequency cursor of the Main Display window. However, the frequency cursor in the 3D plot display (900 in FIG. 9) can be reset by placing the cross of the pointer at the desired spot on the x-axis and clicking the mouse. The new frequency setting is displayed next to the cursor and the Main Display frequency cursor changes accordingly.

The y-axis always shows signal strength scaled between 0 and 255. Any y-Zoom set in the Main Display window will also reflect in the 3D plot display. Indeed, the main purpose of the y-Zoom is to unclutter the 3D display by setting a clear floor above which anomalous signals rise and can be instantly recognised. Y-zoom cannot be set from within the 3D plot display window. No Strength Cursor is displayed. Setting a noise floor with the y-axis zoom can speed up the redrawing of the 3-D display.

The current spectrum, drawn in black, acts as a z axis cursor. Dependent on the spectra sort being used (default is location) the legend on the z axis reports the sort accordingly ("location", "date", "time" etc.). The appropriate data from the current spectrum record is also displayed, so that, on a date sort, the legend might read Date=31/01/94.

The current spectrum can be reset from within the 3D plot display by placing the cross of the pointer just off the z axis end of the required spectral trace and clicking the mouse. Again, this will update the z axis legend accordingly. This is a most useful feature, as it allows the rapid identification of a record of interest from among a display of even hundreds of records. Changing the current spectrum in this way, automatically changes the current record for all other displays.

Figure 9:
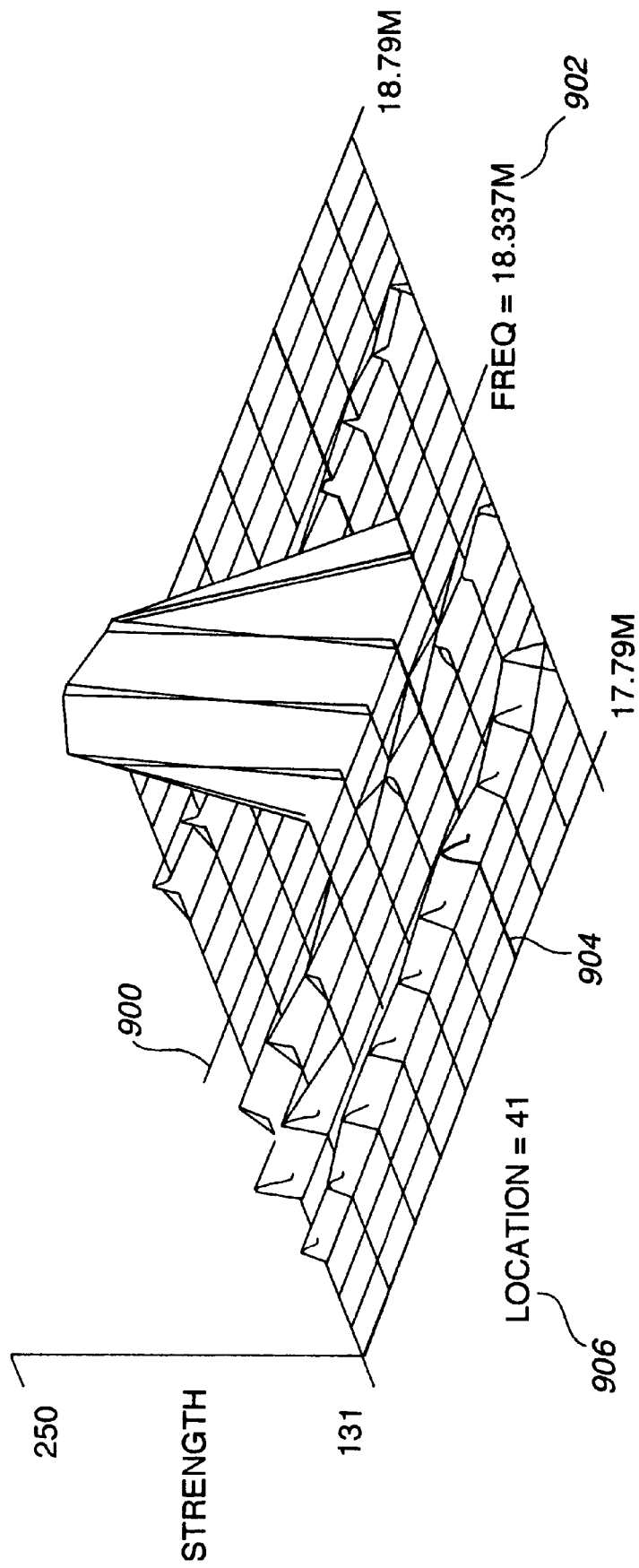
FIG. 9 shows a 3-D plot display with strength on the y-axis, frequency of the x-axis and location on the z-axis, the strength cursor being set to eliminate "noise"
Figure 10:
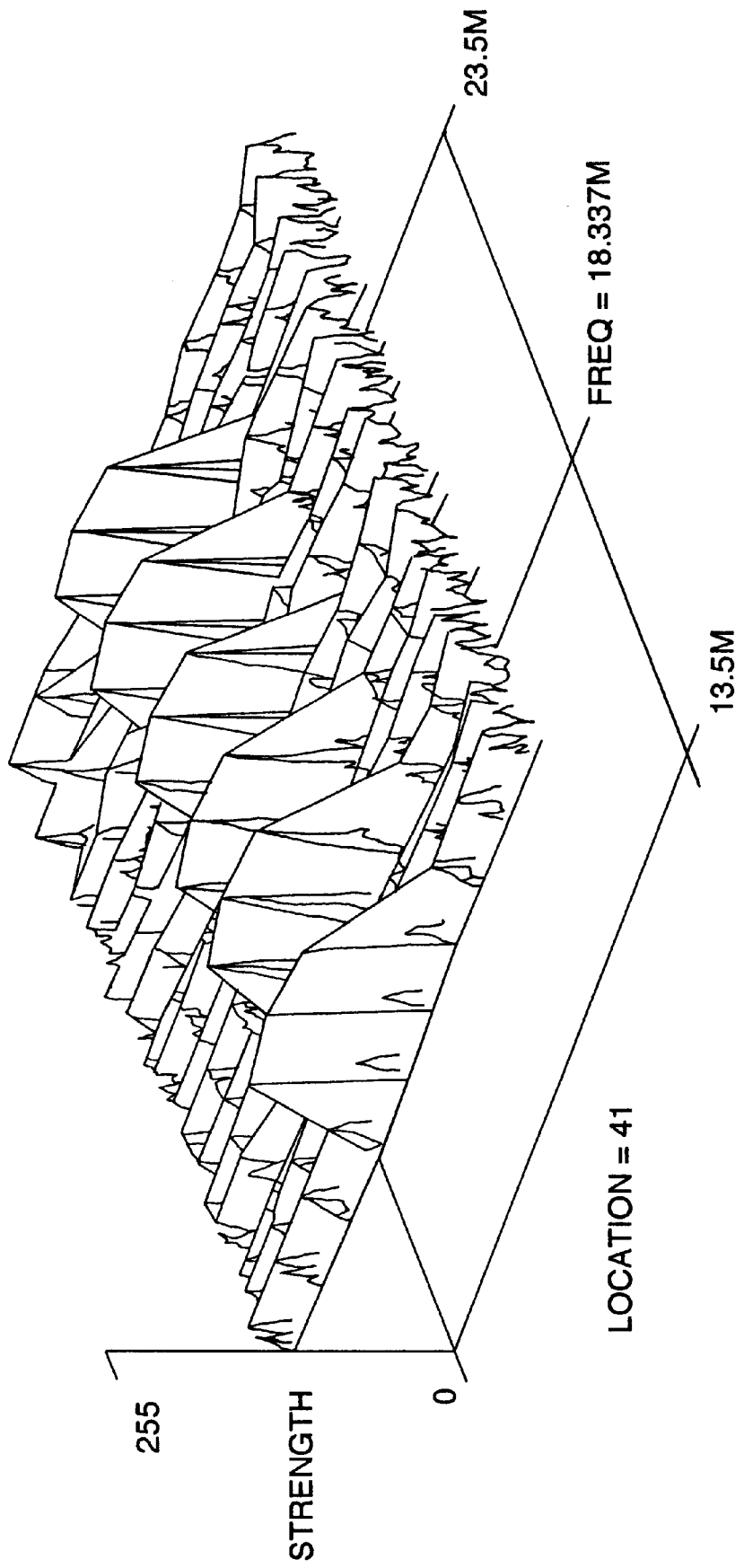
FIG. 10 shows a 3-D plot display for the whole of the upper spectrum and without the strength cursor set.
Figure 11:
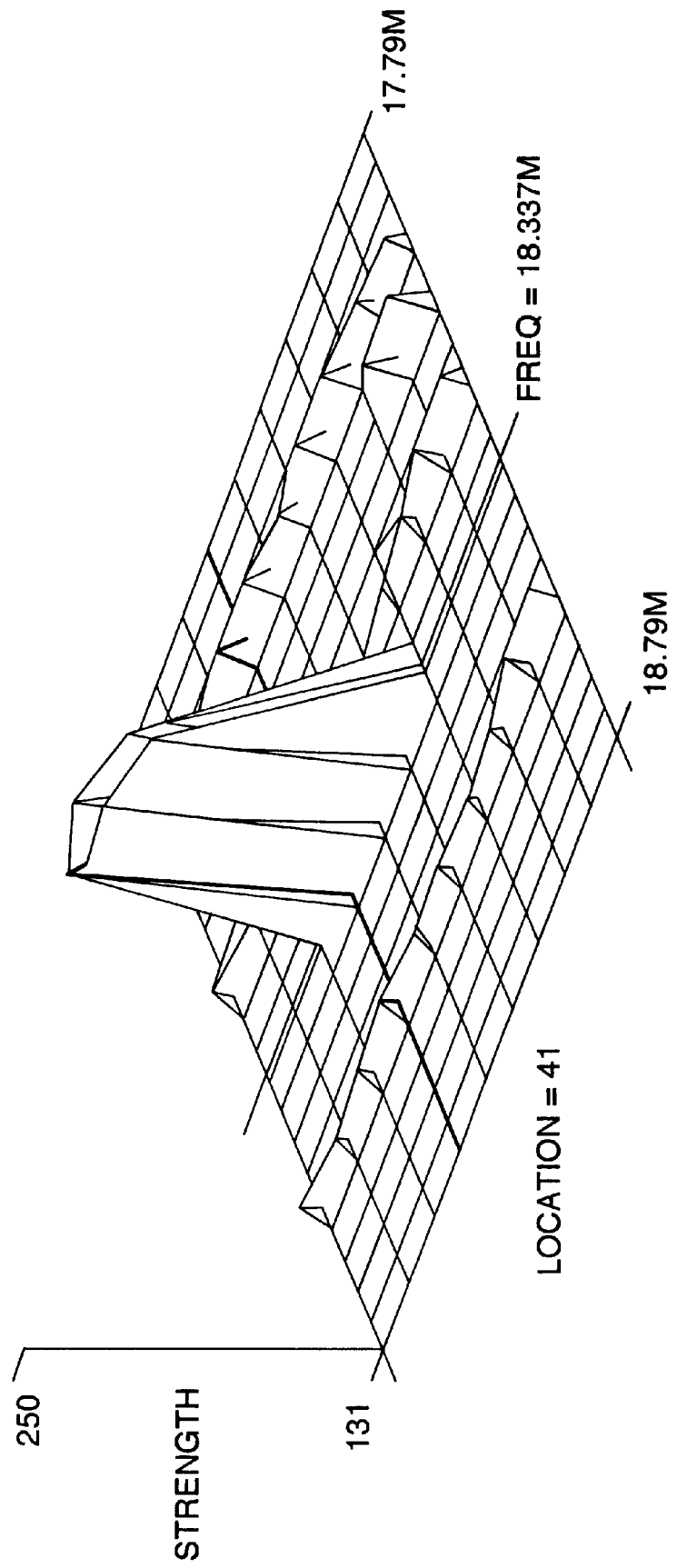
FIG. 11 shows a rotated display of the 3-D plot display of FIG. 9.
Figure 16:
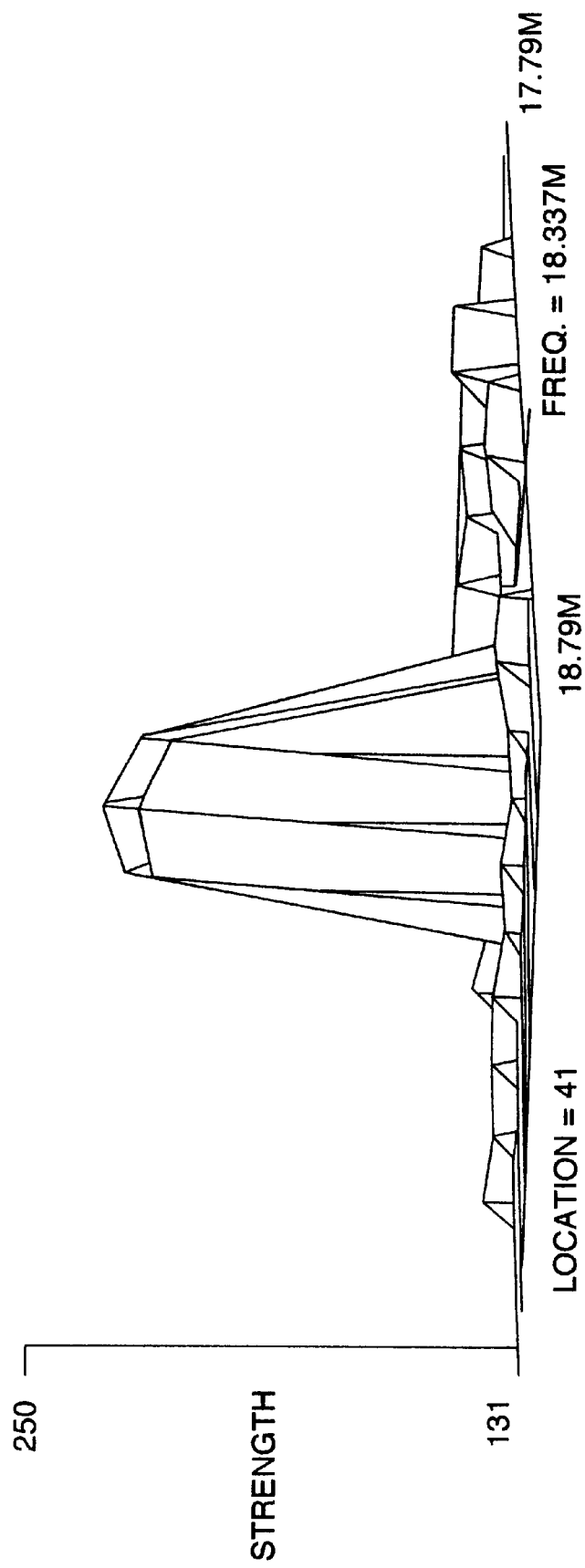
FIG. 16 shows a 3-D plot display with rotation set to give a virtually side-on view.

The 3D plot display is fully rotatable using either cursor control or keyboard commands. FIGS. 9, 11 and 16, for example, show rotated versions of the same 3-D plot display.

When more than a few spectral records are loaded and the PC has a 386 or slower versions of the 486 CPU, there is an appreciable delay while the 3D plot redraws. Use of the Redraw command reduces the likelihood of an involuntary (and therefore timewasting) display redraw occurring. Redrawing of the 3D plot display is also considerably speeded up by setting the strength cursor above the level of noise.

NAMES LIST

The Names command in the Window menu lists, in its own window (FIG. 13), the site, locations, dates, times and colours of the spectra in the current display window. The list can be scrolled if it is too large to fit into its window. This list of names can be printed or copied to the Windows 3.1 clipboard for pasting into a document. The list of names can be sorted by any of the criteria available through the Sort Spectra command. The current record always appears in black. The current record can be changed from within the Names list by clicking the mouse cursor over it. This automatically updates any other display.

PEAKS LIST

The Peaks command on the Window menu calculates the positions of peaks of activity in the current spectrum and lists them in a separate display window (FIG. 14). Only peaks at or above the redline strength cursor are listed. The list can be sorted in order of frequency or signal strength.

When the Peaks window is open, a vertical green cursor line is drawn through all peaks in the Main Display above the strength cursor setting. Any part of the Peaks list can be printed or pasted to the clipboard for inclusion into a document. Selected peaks can also be removed from the list (thus controlling peak identification in the main display). Clicking the mouse on a listed peak will reset the frequency cursor in the Main Display. At ×10 or ×50x-zoom, the Main Display refreshes with the selected peak centred in the display with the frequency cursor set over the peak datum line. 2D plot and 3D plot displays are also updated accordingly.

The Sort by Frequency command causes the peaks of activity in the current spectral record to be listed in frequency order. The Sort by Strength command causes peaks of spectral activity in the current spectral record to be listed in order of relative strength (on the y-axis nominal scale of 0–255).

The Select Peak command allows a user to select any listed peak of activity and automatically to display it in the Main Display. All of the five subsidiary displays are also updated. First, the user clicks the mouse cursor over the desired peak frequency in the Peaks List. This will highlight the desired frequency. Then the user double clicks over the desired frequency. The main display instantly alters to show the selected peak waveform (centred in the display at ×10 or ×50 y-axis zoom). This feature allows the user quickly to assess whether peaks of a similar strength have a similar waveform (i.e. they are probably caused by the same transmitting source). The apparatus may be further adapted to search automatically for peaks of a particular size and/or shape.

The Peak command allows a user to set, for the current record, the size of spectral activity at or above which a peak is determined, marked and listed. The algorithm implemented to identify peaks in the present embodiment is as follows, although other algorithms are readily applicable. First, the redline Strength Cursor in the Main Display window is set at the value at or above which all activity in the current record should be recorded in the Peaks list. Second, a value is set for the number of points on the y-axis (strength) by which activity must first decrease and rise again before a second peak of activity can be recorded.

Without this important Peak Size setting, every consecutive data point on the x-axis with a strength reading above the Strength Cursor setting would read as an individual peak, making all signals with a bandwidth of more than 1 KHz (Scanlock) or 2.5 KHz (Ranger) appear as multiple peaks. The default setting for peak size is 20 strength units. This works well with the Ranger 2+ receiver. If a Scanlock ECM receiver is being used, this value should be reset to 10 or even 5, reflecting the improved signal definition obtainable with that receiver.

The Notes feature (not illustrated) allows a text note to be created and attached to the appropriate record. A note may only be made on the current record. A label giving details of the current record is shown on the top page of the notepad. This label changes as the current record is changed, giving the effect of a notebook that is always open at the right page. Notes are saved automatically as part of their respective spectral record files.

Using the Load Setup, Save Setup and Delete Setup commands a user may construct a multi-pane display of any combination of the six information windows provided by the PC.

This multi-pane Setup can be saved and reloaded using setup files (216 in FIG. 2) on any future occasion.

The Main command is available when in a subsidiary display window and its use returns the user to the Main Display window.

The Communications menu and Help menu will not be described in any further detail, for the sake of brevity. Reference can be made to the Cerberus 2 version 1.4 User Manual, available from Eloka Consultancy and Project Management, PO Box 442, Andover, Hampshire U.K., the contents of which are incorporated herein by reference.

AN EXAMPLE SESSION

An example session of using the apparatus will now be described, using real display examples shown in FIGS. 3 to 21. The background RF activity recorded is that found on a site in the South of England. The VHF bug used is of good quality, being crystal controlled. The bug was outputting approximately 3 mW and was in operation approximately 3.0 m from the receiver when scan was made. The antenna used on the receiver was the standard small whip antenna supplied by the manufacturer and attached directly to the facia of the receiver. The records were made using Datong Ranger 2+ receiver. Records made with one type of receiver are not compatible with records made with another. Both the general appearance and, to some extent, the content of the different types of records will vary.

Important differences between the operation of the receivers and the appearance of spectral records made from their output are as follows. The Audiotel Scanlock ECM receiver utilises digital technology and is frequency synthesised. Records made from its output show complete stability, allowing traces of a bug's activity to 'lock' perfectly into each other. In the Upper Spectrum display which covers 99.5% of the total spectral coverage, the Scanlock provides two and a half times as much data as the Ranger 2+ used in the example session. This contributes to the quality of display possible from its data. However, with the Datong Ranger 2+ receiver, each complete spectral record is made in less than 8% of the time it takes to make a record with a Scanlock ECM. Because there is less data in each Upper Spectrum record, records made with Ranger 2+ handle and process faster than records made with Scanlock ECM data.

In the following example session the user is at a site codenamed TEST, and wishes to check whether or not three rooms are being bugged.

At a fixed position in each room, the user employs the harmonic scanning receiver 18 to make three records of RF activity right across the spectrum. The receiver collects each data set (a record) in less than three minutes. It will then take about one minute more to transfer each record semi-automatically into the PC 10, including labelling it. The PC will file each data record away where it can easily find it again without operator effort. Allowing time to move between the rooms, the user can check all three rooms in about half an hour.

Having obtained the records, (stored now at 214 in FIG. 2) the user operates the PC as follows. In the Main Display, Open is selected on the File menu. A dialogue box opens that shows a list of all the sites whose data files are in the current directory. The user clicks on one of the record sets and then clicks on OK. A new dialogue box opens, showing a list of all the Locations (rooms) in the site for which files are held. Location 11 might be selected and the dates of all files on Location 11 would then be displayed. (Instead, the All button is used to select all locations at once.)

All files were made on the same date, but there could be files of many different dates and times. An All button is used to select all dates and times. An OK button is used to activate the selection; the screen clears and all the data files (i.e. spectral records) begin to load. As the files load, two graphical displays appear (FIG. 3). On the left side of the screen is a trace 300 of RF activity from 0 KHz to 10 MHz. On the right hand of the screen is a trace 302 for RF activity between 10 MHz and 2.0 GHz.

When the files have finished loading traces for all selected records are overlaid on the display, wih the current record (last loaded) in black or bold. Placing the pointer (not shown) at random on the right hand display and clicking will cause the frequency cursor to appear as a red line, together with a readout of the frequency where it intersects the x axis of the display.

Pressing the Page Down key on the keyboard the Lower spectrum display will disappear and the Upper spectrum display redraws, filling the screen as at FIG. 4. As each trace overlays the other, the general pattern of activity is repeated but there are minor changes. This is because the use of the spectrum is continually changing from second to second and the detailed levels of activity depicted record these changes. Nevertheless, the general background level of activity is determined and the presence of a bug or any other transmitter operating in the vicinity of the receiver will show a gross departure from it. Since the receiver records not only activity on a fundamental frequency but aggregates with that all the activity on harmonics of the fundamental frequency, a single frequency transmitter will show up as several spikes 406–414 on the display.

The overlaid spectral records show no gross variation but can make for a cluttered display even with just three records loaded. With more records loaded, however, it rapidly becomes unreadable. We need to adjust the display so we only see what we are looking for, gross upward and repeated variances in RF activity. To do this, we reset the y axis of the display so that virtually all the 'noise' is removed.

We are already showing a redline frequency cursor 400 on the display with an x axis readout (18.340 MHz). To adjust the y axis, we need to bring a second cursor into use. Pressing <s> on the keyboard and then clicking the mouse causes the pointer to change shape to a horizontal cross and a horizontal redline cursor 416 to appear together with a readout of signal strength. Moving the pointer to any desired signal strength and clicking on the mouse causes the horizontal cursor to be set immediately to the level indicated (210).

Control of the horizontal signal strength cursor 416 and the vertical frequency cursor 400 is toggled by using the <s> and <f> keys on the keyboard. Pressing <f>, the pointer changes shape to a vertical cross. The mouse is then used to click at a particular spot on the trace or at a frequency on the x axis to see the frequency cursor move to that point.

Clicking on, say, the 250 level on the y axis causes the cursor to be set there. While holding down the <Ctrl> key, the pointer changes to a triple bar shape indicating that it is conditioned for a Y axis Zoom. Holding down the button on the mouse allows dragging. A new maximum value for the y axis has now been selected (line 500 at level 250). Keeping the <Ctrl> key pressed and dragging the mouse downwards causes a second blue cursor to appear that follows the downward movement of the mouse. Dragging the second blue cursor until it just intersects with the topmost peaks of the displayed traces (level 131) and releasing the <Ctrl> key to stabilise the cursor positions will set the minimum y axis value to be displayed (line 502 at level 131). Pointing and clicking on View in the menu bar at the top of the window, and then on Y-Zoom causes the display window to clear and rewrite.

After the delay it takes to redraw the nine records loaded, the screen is now clear except for just a few blips right at the bottom. These are the recorded maximum peak values for the background electromagnetic 'noise'. The display is now set to show clearly and simply any bugging activity that will add to the values of background activity recorded. Note that the minimum value for the y axis is now that set by use of the blue minimum strength cursor 502.

After loading all records for all locations, there are now nine traces to redraw. Three strong signals appear on the display (FIG. 4) and overwrite, in different colours three times. These traces represent a strong signal recorded on the same frequency in each of three separate spectral records—but is it a bug! And, if so, in which room!

Toggling to control of the frequency cursor by pressing <f>, and pointing and clicking on one of the 'spikes' on the display, causes the frequency cursor to be reset to the spike (18.337 MHz). Zooming in on the x axis and pressing <PgDn> causes the window to redraw. The first press of <PgDn> zooms the x axis x10, so as to display only one tenth of the maximum display, with the point at which the frequency cursor is set in the middle of the display. This is the position in FIG. 5. FIG. 6 shows the same with the y-zoom engaged. Pressing <PgDn> again, x50 zoom is engaged, allowing maximum display width to only a 200 KHz spread of local oscillator frequency. Pressing <PgUp> returns to x10 zoom. Rather than stepping through zoom levels using <PgUp> and <PgDn>, one can open the View menu and just click directly on the zoom level required. When a large number of spectral records are loaded, this is a time saver.

Figure 5:
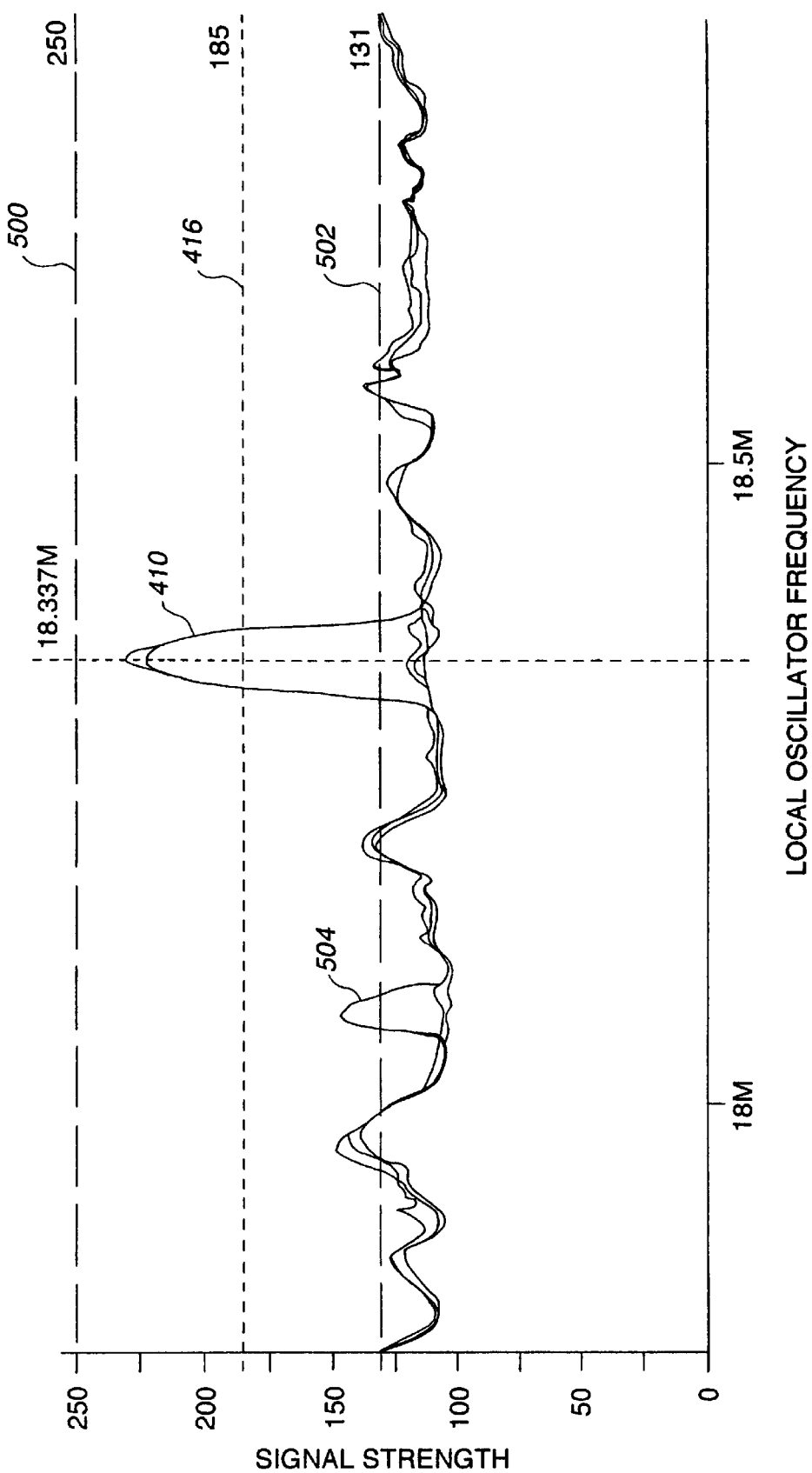
FIG. 5 shows the display of FIG. 4 with the frequency axis at x-zoom ×10 and the maxima and minima values set on the y-axis (signal strength)
Figure 6:
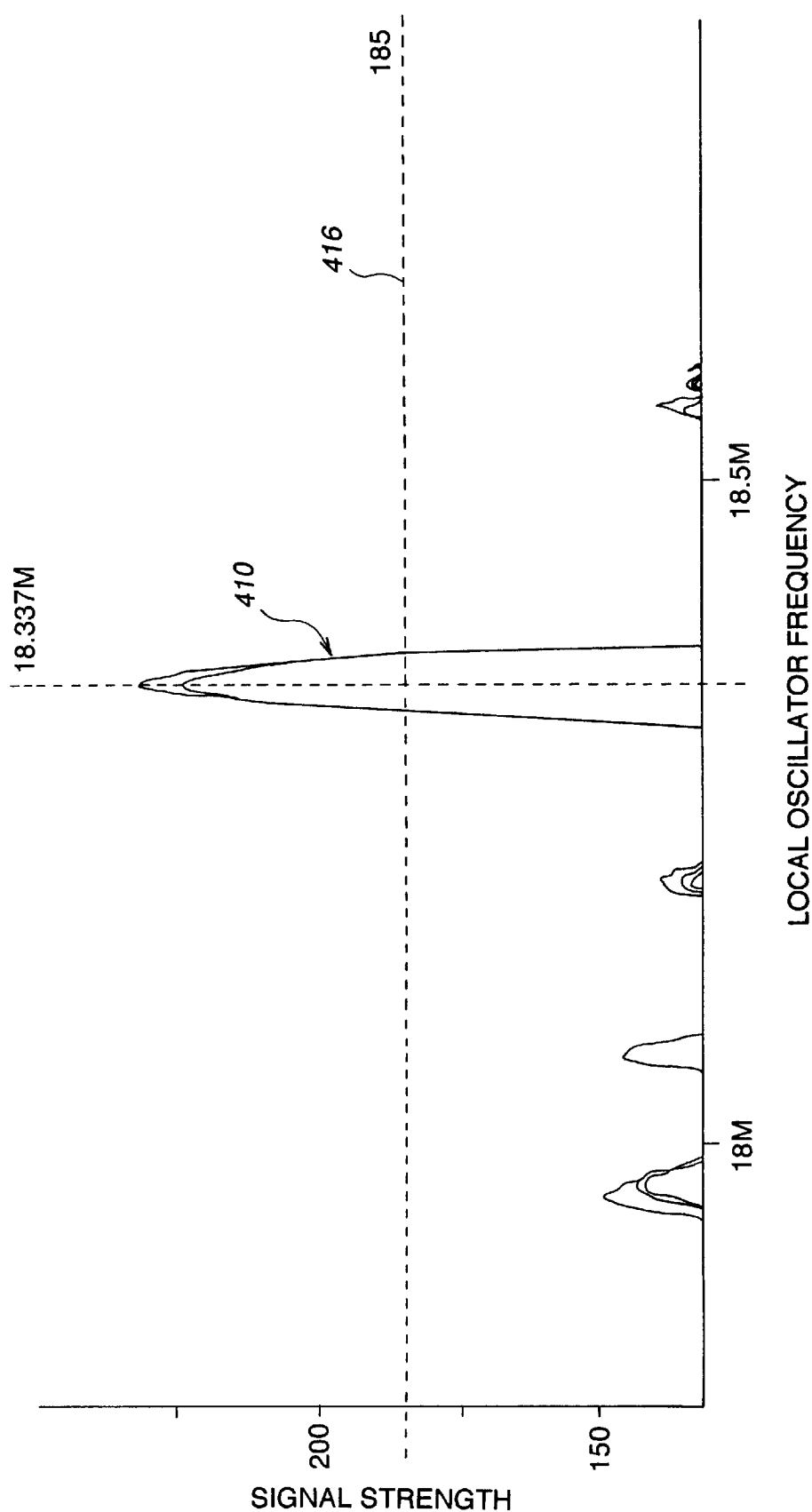
FIG. 6 shows the plot of FIG. 5 after y-zoom has been implemented.

Turning now to the analysis, looking at the magnified 'spike' 410 in FIG. 5 or FIG. 6 shows that it is comprised of the peaks of three traces. These peaks are very closely locked together as to frequency (the bug is crystal controlled) but there is some variance in displayed signal strength. This variance is due to changes in levels in the now unseen background activity, on top of which the bug signals will have been added.

This simple display certainly looks like a bug in itself. For it to be confirmed, however, all the peaks comprising the spike must be found only in one location (or close to it). If the spike is caused by a strong broadcast signal, for example, then the peaks will be found in all locations at about the same value. On the other hand, if a peak is caused by a passing police or taxi transmission, it will 'multi-spike' like a bug in any one record, but will tend not to appear in all records for that location because the readings will have been made at some minutes apart. In FIG. 5, for example, there is a small but conspicuous peak 504 in one trace only. Since RF activity has been recorded in discrete locations at different times, a passing taxi (or similar transmission) will tend only to be recorded in one location. Since peak 504 does not appear in all traces for the same location, it is disregarded as a transient. For peaks which are localised and cannot be disregarded, the user is interested to determine in which location or locations were the peaks that make up this spike found, and uses the 2D plot display.

Though the Main Display window is also a two dimensional display, the subsidiary 2-D plot display examines all activity on a single frequency for any number of open records. This display, by default, shows signal strength plotted against the locations in which the spectral records were made. This default display can be changed as is explained elsewhere. The capability to 'look through' the Main Display with a fully relational linking of records is a novel and powerful tool for visual analysis and makes the apparatus a valuable and unique aid in the detection and location of local sources of RF transmission, whatever the type of signal modulation or transmission technique.

As shown in FIG. 7, the 2-D plot command opens a new window, still with signal strength on the y axis but with the locations of records instead of frequency on the x axis. Records are shown as vertical bars such as at 700, 702 and 704, each of which shows the signal strength for each record at the frequency set with the frequency cursor in the main display. The frequency cursor remains set accurately at the peak of interest. With the y axis zoom still engaged (as in FIG. 6), naturally only records with strength readings above the user-set floor will register in the display.

The FIG. 7 display shows a consistent rise in RF activity in all records made in only one location and on a single frequency. This is the strong evidence that there is a transmitter within that location or adjacent to it. The recorded strength of all records at the specified frequency at any strength level can be seen by pressing the <Insert> key. This is an on/off toggle for the y zoom. With y zoom toggled off (FIG. 8), the background noise level in every record can be seen, with a marked increase in strength in the one location that is bugged. Leaving the y zoom toggled on, we close the 2-D window and return to the Main Display (FIG. 6).

Other 2D plot display examples for the same spectral records are shown in FIGS. 17, 18 and 19, mentioned elsewhere. The example Peaks List display of FIG. 13 identifies each of the spikes 406 to 414. Clicking on each entry in turn will set the frequency cursor to the listed frequency, so that the 2D plot display will show whether the association with only a certain location, date or time is repeated for all of these spikes.

The 3D plot display of FIGS. 9 to 12 can give additional information as to what is going on in the RF spectrum, and is obtained by clicking 3-D plot in the Windows menu, then on Redraw in the View commands' menu. This display depicts signal strength, location and frequency plotted together to produce a three dimensional surface, showing unusually high levels of RF activity as hills rising above the planar surface of a pre-set y zoom floor. Zooming out on the x zoom (PgUp) to ×1, allows all activity in all records to be seen simultaneously (FIG. 10), right across the VHF part of the spectrum.

This 3-D plot display is another powerful tool, allowing a user to appreciate instantly where, across the entire 10 MHz–2,000 MHz spectrum and for all open records, anomalous activity has occurred. Unusual activity is quickly spotted and can be subjected to detailed attention. This facility is capable of dealing with larger and more complex situations than is depicted in the simple test records illustrated.

Effective use of the 3-D plot display relies on sensible use of the y-zoom facility, set from the Main Display. Without the removal of unwanted 'noise', the display rapidly becomes unreadable because of the complexity of the surface mapping. One function of the apparatus is thus to cut away the complexity that "hides the needle in the haystack". Though the y zoom cannot be set from the 3-D plot display, it can be turned on and off, either by menu selection from the View menu or toggled using the <Insert> key on the keyboard.

The 3-D plot display has two cursors. The first is a red one 900, on the x (frequency) axis. There is also a black cursor 904 on the z axis. The z axis cursor can be made to stand out better by selecting Colours from the View menu and then Colour+Bold. This selection can be made from any of the one of the three displays and will be activated in all three. This black cursor 904 overlays what is called the 'current' spectral record. This is the record whose full details are shown at the top of the Main Display window. By default, this will always be the last record selected for opening. The selection of a current record can be changed in consecutive order by use of the <Tab> key or <Shift Tab>. More quickly, the current record can be set to any record loaded into the Main Display by resetting the z axis cursor 904 in the 3-D plot display. The relevant part of record information for the z axis cursor setting is shown against the z axis at 906 on the 3-D plot display.

In the same way as the pointer changes its form, dependent on where it is placed on the Main Display, so it does in the 3-D plot display. However, in this display, the cross has an elongated vertical element making it look a little like a sword (not illustrated).

The frequency cursor is moved by placing the cross piece of the sword anywhere on the matrix to which the cursor is to be moved and clicking the mouse. The screen will redraw with the frequency cursor 900 in the new position. The frequency to which it is set is printed at 902 on the display. The frequency cursor can be set from either the Main Display or 3-D plot display, each automatically adjusting the other. Also, setting of the frequency cursor from either of these two displays will determine the readouts depicted in the subsidiary 2-D plot display.

The z axis cursor is moved by placing the cross of the sword close to the point on the z axis to which the cursor is to be placed, making sure that the cross is just outside the matrix (otherwise it will move the frequency cursor). Having placed the pointer accurately, clicking on the mouse causes the screen to redraw.

One potential disadvantage of a 3-D surface type display is that there is a 'shadow effect', where large features conceal small ones that appear to lie behind them, given the 'line of sight' provided by the display. The apparatus overcomes this effect by allowing the user to (i) rotate the display horizontally through 360°, so every facet can be examined and/or (ii) rotate of the display through 90° in the vertical plane, giving the effect of changing the line of sight from horizontal to the planar floor to being vertically overhead of the display matrix.

Figure 12:
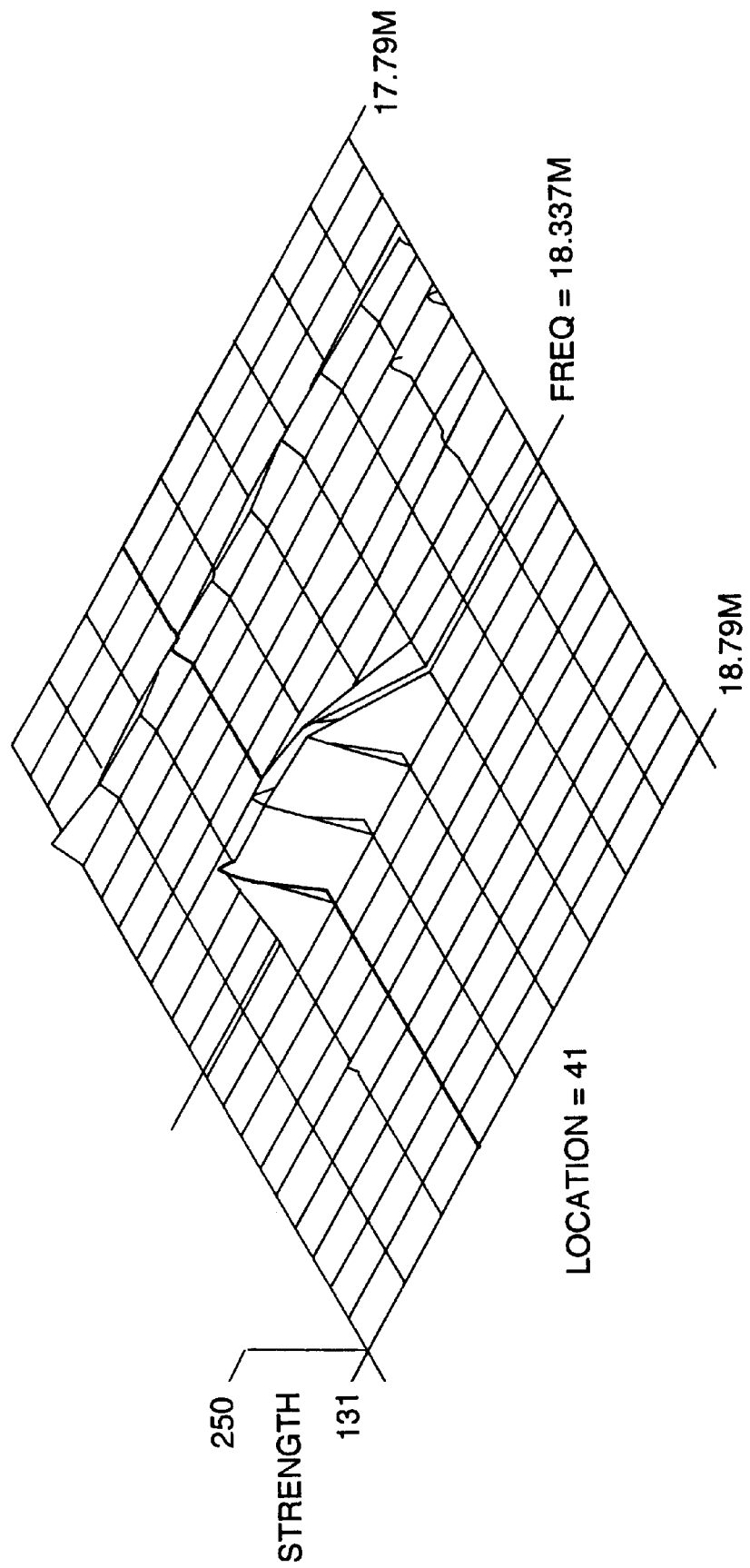
FIG. 12 shows the 3-D plot display of FIG. 11 with the vertical rotation increased (offering increased visibility at the cost of a reduction in the size of features)

Horizontal and vertical rotations are controlled via scroll bars at the bottom and side of the 3-D plot display by placing the pointer over one of the scroll buttons, locking control on to it by clicking the mouse and then dragging and releasing the scroll button. FIG. 11 shows the same plot as FIG. 9, rotated horizontally by 180° to reveal detail behind major peaks. FIG. 12 shows increased vertical rotation of the same plot. FIG. 16 shows reduced vertical rotation. The default positions (FIG. 9) are chosen to give the most generally useful viewing angle. FIGS. 20 and 21 show the "stacked silhouette" display option, corresponding respectively to the netted surface displays of FIGS. 9 and 10, but with records loaded for Location 11 only.

As described above with respect to the records for location 11, the apparatus records, stores and can display a total frequency coverage of 0–2000 MHz. It does this using two displays which, though similar, have substantial differences. The upper spectral display that has been described so far shows an x axis frequency scale that covers the 8 or 10 MHz local oscillator spread of the receiver. The receiver records relative voltage levels resulting from mixing its local oscillator output with the electromagnetic energy received from the antenna and/or mains probe. As the local oscillator output level is constant, any changes in voltage levels are caused by changes in RF received. The relative levels are assigned by a pump charge A-D converter device and lie on a scale of 0–255. Voltage levels for each of about 4,000 points along the 10 MHz local oscillator spread (Ranger) or 10,000 points over 8 MHz (Scanlock) are recorded.

For the Upper spectrum (10–2,000 MHz), the level assigned to each point of measurement (or bin) is the accumulated result of activity on a tuned fundamental local oscillator frequency and all of that fundamental's harmonics that lie within the defined range. Therefore, the value assigned to each bin represents the accumulated activity of many RF channels. One result of this accumulation is that there is a very substantial noise floor present in every Upper spectrum record. Peaks of activity are seen above this floor, with emissions close to the receiver or otherwise strong relative to the average level of background activity producing peaks that ride on top of whatever is the level of ambient activity.

This accumulative method of working also means that it is not possible to tell the frequency of any RF signal detected. Though there is a formula that can be applied to convert the local oscillator frequency to determine the radio frequency that it has been mixed with, the receiver's harmonic rich design means that there will always be a multiple choice of answers and no means of knowing the right one. For many radio receiver applications this would be a fatal design flaw. However, for the detection of bugs, illicit and covert low power transmitters at close range, it is not a disadvantage. Determining the actual operating frequency is of the bug of no value to a technical surveillance countermeasures (TSCM) operator. All that matters is that the presence of an operating bug can be quickly and certainly detected and, subsequently, that it can be located. In fact, this 'multiple frequency' way of working has real advantages in TSCM work.

The main advantages are:

A harmonic scanner can complete a scan in a very small fraction of the time required by a conventional receiver.

In a single scan it will detect the presence of a nearby transmitter many times. Using the PC with a Ranger 2+, a clean transmitter (i.e. one not producing much harmonic radiation itself) will be clearly seen as peaks of activity three times for a 25 MHz carrier frequency, twelve times at 250 MHz and over one hundred times at a frequency of 1500 MHz. If the transmitter itself is 'dirty', many more peaks of activity would be recorded. In a single pass with a conventional receiver detection of a low power transmitter can never be certain. Proper use of a harmonic scanner with the present apparatus makes detection certain.

Several countries prohibit the importation, possession or use of equipment that can tune to RF frequencies outside of the public service bands.

Harmonic scanners tune their local oscillators and neither tune, select or determine any radio frequencies outside of the permitted range.

For the Lower spectrum of 0–10 MHz, a representation of a tuned radio frequency is given on the Main Display x axis. In this part of the spectrum the receiver also assigns a value to the RF activity detected in about 4,000 bins. However it does not accumulate activity on the fundamental frequency with that of the harmonics, rather each record of harmonic activity will be shown separately. This produces a display like a 'many humped camel' rather than the spikes seen in the upper spectrum display as can be seen for example in Window 1500 of FIG. 15. Because of the receiver design, two hundred times as much information is represented in an VHF spectrum display than in a VLF spectrum display.

An examination of the lower spectrum (0–10 MHz) will now be described. From the View menu in the Main Display, clicking on VLF Spectrum (whatever the x-zoom level set) causes the display to redraw to show nine spectral records of activity in the three locations on which information has been loaded. It is immediately clear that three records are showing a drastically higher level of activity with several harmonics, in comparison with the other six, between which there is little significant change.

The effect caused is sufficiently gross and the part of the RF spectrum being examined is so limited that there is no value to be obtained from the use of the 3-D plot display. However, use of the secondary 2-D plot display is useful to determine rapidly which location(s) the radiation was detected in. Concurrently setting up the 2-D plot display with the Main Display and clicking the frequency cursor from peak to peak on the 'many humped camel' shows conclusively that all records reporting the suspect radiation were made in location 61. Indeed, the records show the presence of a low frequency f.m. mains bug.

Of course, analysis becomes more difficult where the signal to be detected is at a level closer to the background "noise", or where large peaks from non-local sources are many in number. However, compared with known techniques such as "Lock to Strongest", the present apparatus and method of working allow reliable detection even in noisy environments previously too difficult to tackle at reasonable cost. In particular, the tools provided enable large numbers of spectral peaks to be considered rapidly while reliably rejecting transient and distant sources.

As mentioned above, the invention is not limited to bug detection. Another application for the same apparatus would be detecting emissions from leaky data cables in a communications network. Other embodiments are not limited to radio frequency radiation, nor to detection of local radiation sources. Comparison to compare spectra recorded at different times without reference to location may also be of interest.

I claim:

1. A method of detecting an unknown local radiation source in an environment where other radiation sources constitute significant levels of background noise, the method comprising:

operating a radiation receiving device at different locations within a site of interest to obtain plural spectral records, each such spectral record recording a spectrum of radiation present at a respective location from the different locations; and collating the spectral records for the site of interest to distinguish spectral features associated with a specific location from the different locations within the site from features generally present throughout the site.

2. A method according to claim 1, wherein the spectral records are collected in a computer-based analysis apparatus, the analysis apparatus being adapted by programming to display, overlaid or juxtaposed for visual comparison, graphs representing the different spectra.

3. A method according to claim 2, including:

operating the analysis apparatus to select and display superimposed in a graph one or more subsets of said spectral records, so as to allow direct visual comparison of at least a part of the spectrum, as recorded at different times and locations.

4. A method according to claim 2, including:

operating the analysis apparatus to select and display in a graph data from one or more subsets of said spectral records, so as to allow direct visual comparison of the radiation levels present at a selected frequency within the radiation spectrum at different times and different locations.

5. A method according to claim 2, including:

operating the analysis apparatus to select and display data from one or more subsets of said spectral records in a three-dimensional graph, so as to allow direct visual comparison of at least a part of the radiation spectrum, as recorded at different times or at different locations, the three-dimensional graph having a first axis representing radiation frequency, a second axis representing radiation strength, and a third axis along which the different records are separated.

6. A method according to claim 5, further comprising operating the analysis apparatus to display a two-dimensional graph of signal strength at a selected frequency, corresponding to a cross-section of the three-dimensional graph parallel to the third axis.

7. A method according to claim 5, wherein in said two-dimensional graph spectral records are sorted according to location, date, time or weekday.

8. A method according to claim 2, wherein the analysis apparatus is operated so as to:

identify peaks of signal strength in a given spectral record, according to user defined criteria;

select a peak of interest from among the identified peaks; and display the selected peak juxtaposed with corresponding portions of other spectral records so as to enable visual comparison.

9. A method according to claim 8, wherein the strengths of the different spectral records at the frequency of the selected peak are displayed on a two-dimensional graph.

10. A method according to claim 1, wherein said radiation receiving devices comprises a radio frequency scanning receiver.

11. A method according to claim 10, wherein the receiver provides harmonic scanning, such that activity at a given frequency of radiation is recorded at a plurality of frequencies in each recorded spectrum.

12. A method according to claim 10, wherein each spectral record represents activity recorded over a plurality of successive scans of the receiver frequency, each scan taking a finite period of time.

13. A method according to claim 12, wherein the receiver outputs a strength value for each of a plurality of frequency bins and the strength value for each bin is updated in response to each successive scan only if it exceeds the strength value obtained in previous scans.

14. A method according to claim 1, wherein a plurality of spectral records are made for each location during different time periods, and wherein plural spectral records for a given location are compared to distinguish spectral features permanently associated with the given location from transient spectral features that appear to be associated with the given location only because of the time of making a particular spectral record.

15. A radiation monitoring method comprising:

operating a radiation receiving device to obtain plural spectral records, each record comprising a spectrum of radiation present at a given time and location;

collecting the spectral records in a computer-based analysis apparatus having a display; and operating the analysis apparatus to select and display superimposed in a graph one or more subsets of said spectral records, so as to allow direct visual comparison of the spectrum present at different times or locations.

16. A radiation monitoring method comprising:

operating a radiation receiving device to obtain plural spectral records, each record comprising a spectrum of radiation present at a given time and location;

collecting the spectral records in a computer-based analysis apparatus having a display; and operating the analysis apparatus to select and display in a graph data from one or more subsets of said spectral records, so as to allow direct visual comparison of the radiation levels present at a given frequency in the radiation spectrum at different times or different locations.

17. A radiation monitoring method comprising:

operating a radiation receiving device to obtain plural spectral records, each record comprising a spectrum of radiation present at a given time and location;

collecting the spectral records in a computer-based analysis apparatus having a display; and operating the analysis apparatus to select and display in a three-dimensional graph data from one or more subsets of said spectral records, so as to allow direct visual comparison of at least a part of the radiation spectrum at different times or at different locations, the three-dimensional graph having a first axis representing radiation frequency, a second axis representing radiation strength, and a third axis along which the different records are separated.

18. A method according to claim 17, further comprising operating the analysis apparatus to display a two-dimensional graph of signal strength at a selected frequency, corresponding to a cross-section of the three-dimensional graph parallel to the third axis.

19. A method according to claim 18, wherein in said two-dimensional graph spectral records are sorted by the analysis apparatus according to location, date, time or weekday.

20. An analysis apparatus for use in detecting an unknown radiation source in an environment where other radiation sources constitute significant levels of background noise, the apparatus comprising:
 a receiver for receiving plural spectral records obtained by a radiation receiving device operated at different locations within a site of interest, each spectral record recording the spectrum of radiation present at a respective location; and
 a collator for collating the spectral records for the site of interest to distinguish spectral features associated with a specific location within the site from features generally present throughout the site.

21. An apparatus according to claim 20 in the form of a programmed computer, the collator comprising means adapted by programming to display, juxtaposed for visual comparison, graphs representing the different spectra.

22. An apparatus according to claim 20, wherein the collator includes:
 means adapted to select and display superimposed in a graph one or more subsets of said spectral records, so as to allow direct visual comparison of at least a part of the spectrum, as recorded at different times and locations.

23. An apparatus according to claim 20, wherein the collator includes:
 means adapted to select and display in a graph data from one or more subsets of said spectral records, so as to allow direct visual comparison of the radiation levels present at a selected frequency within the radiation spectrum at different times and different locations.

24. An apparatus according to claim 20, wherein the collator includes:
 means adapted to select and display data from one or more subsets of said spectral records in a three-dimensional graph, so as to allow direct visual comparison of at least a part of the radiation spectrum, as recorded at different times or at different locations, the three-dimensional graph having a first axis representing radiation frequency, a second axis representing radiation strength, and a third axis along which the different records are separated.

25. An apparatus according to claim 24, wherein the collator further comprises means adapted to display a two-dimensional graph of signal strength at a selected frequency, corresponding to a cross-section of the three-dimensional graph parallel to the third axis.

26. An apparatus according to claim 24, wherein said two-dimensional graph spectral records are sorted according to location, date, time or weekday.

27. An apparatus according to claim 20, wherein the collator includes:
 means for identifying peaks of signal strength in a given spectral record, according to user defined criteria;
 means for the user to select a peak of interest from among the identified peaks; and
 means for displaying the selected peak overlaid or juxtaposed with corresponding portions of other spectral records so as to enable visual comparison.

28. An apparatus according to claim 27, wherein the strengths of the different spectral records at the frequency of the selected peak are displayed on a two-dimensional graph.

29. An apparatus according to claim 20, specifically adapted to receive and collate plural spectral records made at different times at a common location.

30. An apparatus according to claim 20, specifically adapted to receive spectral records from a radiation receiving device in the form of a radio frequency scanning receiver.

31. An apparatus according to claim 20, wherein said receiver comprises a direct communications link for a local radiation receiving device.

32. An apparatus according to claim 20, wherein said receiver includes a means for receiving spectral records from a remote radiation receiving device.

33. A radiation monitoring method, comprising the steps of:
 operating a radiation receiving device to obtain plural spectral records, each such record comprising a spectrum of radiation present at a given time and location;
 collecting the spectral records in a computer-based analysis apparatus having a display; and
 operating the analysis apparatus to select and display data from a plurality of said spectral records, so as to allow direct visual comparison thereof.

34. A method according to claim 33, wherein the radiation receiving device is operated to obtain each of said spectral records at a different respective time at the same location.

35. A method according to claim 33, wherein the radiation receiving device is operated to obtain at least one spectral record at a plurality of different respective locations.

36. A method according to claim 35, wherein the radiation receiving device is operated to obtain a plurality of spectral records at each respective location, each being recorded at a different respective time.

37. An analysis apparatus for use in monitoring radiation, comprising:
 a receiver for receiving plural spectral records, each record comprising a spectrum of radiation recorded by a radiation receiving device at a given time and location;
 a store for storing the spectral records in accordance with time and location of recording; and
 a selector for selecting data from a plurality of the spectral records for display so as to allow direct visual comparison thereof.

38. An apparatus according to claim 37, wherein the selector is operable to select data from one or more subsets of the spectral records as selected data and to generate data for display showing the selected data superimposed in a graph which allows direct visual comparison of the spectrum present at different times or locations.

39. An apparatus according to claim 37, wherein the selector is operable to select data from one or more subsets of the spectral records as selected data and to generate data for display showing the selected data in a graph which allows direct visual comparison of the radiation levels present at a given frequency in the radiation spectrum at different times or different locations.

40. An apparatus according to claim 37, wherein the selector is operable to select data from one or more subsets of the spectral records as selected data and to generate data for display showing the selected data in a three-dimensional graph which allows direct visual comparison of at least a part of the radiation spectrum at different times or at different locations, the three-dimensional graph having a first axis representing radiation frequency, a second axis representing radiation strength, and a third axis along which the different records are separated.

41. A record carrier or signal conveying instructions for causing a programmable processing apparatus to become configured as an apparatus as claimed in claim 20 or claim 37.

* * * * *